(12) United States Patent
Nelson et al.

(10) Patent No.: US 6,347,027 B1
(45) Date of Patent: Feb. 12, 2002

(54) METHOD AND APPARATUS FOR AUTOMATED RECONFIGURATION OF AN ELECTRIC POWER DISTRIBUTION SYSTEM WITH ENHANCED PROTECTION

(75) Inventors: William Christian Tracy Nelson, Duvall; Donald S. Berkowitz, Redmond, both of WA (US); Witold Bik, El Cerrito, CA (US); Michael A. Maloney, Woodinville, WA (US)

(73) Assignee: EnergyLine Systems, Inc., Alameda, CA (US)

( * ) Notice: Subject to any disclaimer, the term of this patent is extended or adjusted under 35 U.S.C. 154(b) by 0 days.

(21) Appl. No.: 09/502,906

(22) Filed: Feb. 11, 2000

Related U.S. Application Data

(63) Continuation-in-part of application No. 09/294,588, filed on Apr. 20, 1999, now Pat. No. 6,111,735, which is a continuation of application No. 08/978,966, filed on Nov. 26, 1997, now Pat. No. 6,018,449.
(60) Provisional application No. 60/119,855, filed on Feb. 12, 1999.

(51) Int. Cl.$^7$ .................................................. H02H 3/00
(52) U.S. Cl. ............................ 361/64; 361/66; 361/68
(58) Field of Search ........................ 361/59, 62–69, 361/71–75, 96–97; 307/125–127, 129, 131, 38–40

(56) References Cited

U.S. PATENT DOCUMENTS

| | | |
|---|---|---|
| 3,152,286 A | 10/1964 | Field et al. |
| 3,331,921 A | 7/1967 | Neiswinter et al. |
| 3,702,460 A | 11/1972 | Blose |
| 3,970,898 A * | 7/1976 | Baumann et al. ............. 361/68 |
| 4,057,758 A | 11/1977 | Furniss et al. |
| 4,075,699 A | 2/1978 | Schneider et al. |
| 4,315,251 A | 2/1982 | Robinson et al. |
| 4,359,644 A | 11/1982 | Foord |
| 4,396,915 A | 8/1983 | Farnsworth et al. |
| 4,535,409 A | 8/1985 | Jindrick et al. |
| 4,587,588 A | 5/1986 | Goldstein |
| 4,672,555 A | 6/1987 | Hart et al. |
| 4,745,512 A | 5/1988 | Hampson |
| 4,777,381 A | 10/1988 | Fernandes |
| 4,803,635 A | 2/1989 | Andow |
| 4,835,651 A | 5/1989 | Li et al. |
| 4,847,780 A | 7/1989 | Gilker et al. |
| 4,868,410 A | 9/1989 | Nakamura |

(List continued on next page.)

OTHER PUBLICATIONS

Caird K. et al., "An Advanced Distribution Automation RTU." Westronic, Inc., Canada, 1990, pp 1–8.
"Model 2801–SC Automatic Switch Control User's Manual," EnergyLine Systems, Inc., Berkeley, CA., DOCO024–000691–OF, Nov. 2, 1995.

(List continued on next page.)

Primary Examiner—Michael J. Sherry
(74) Attorney, Agent, or Firm—Graybeal Jackson Haley LLP

(57) ABSTRACT

Method and apparatus for controlling an electric power distribution system including the use and coordination of information conveyed over communications to dynamically modify the protection characteristics of distribution devices (including but not limited to substation breakers, reclosing substation breakers, and line reclosers). In this way, overall protection and reconfigurability of the distribution system or "team" is greatly enhanced. According to additional aspects of the invention, devices within the system recognize the existence of cooperating devices outside of the team's domain of direct control, managing information from these devices such that more intelligent local decision making and inter-team coordination can be performed. This information may include logical status indications, control requests, analog values or other data.

30 Claims, 13 Drawing Sheets

U.S. PATENT DOCUMENTS

| | | | |
|---|---|---|---|
| 4,916,628 A | | 4/1990 | Kugler |
| 4,972,290 A | | 11/1990 | Sun et al. |
| 4,984,124 A | | 1/1991 | Yeh |
| 5,006,846 A | | 4/1991 | Granville et al. |
| 5,179,376 A | | 1/1993 | Pomatto |
| 5,303,112 A | | 4/1994 | Zulaski et al. |
| 5,305,174 A | | 4/1994 | Morita et al. |
| 5,341,268 A | | 8/1994 | Ishiguro et al. |
| 5,513,061 A | * | 4/1996 | Gelbien et al. ............... 361/63 |
| 5,517,423 A | | 5/1996 | Pomatto |
| 5,701,226 A | | 12/1997 | Gelbien et al. |
| 5,784,237 A | * | 7/1998 | Velez ........................... 361/62 |
| 5,793,750 A | | 8/1998 | Schweitzer, III et al. |
| 5,973,899 A | | 10/1998 | Williams et al. |
| 5,940,260 A | * | 8/1999 | Gelbien et al. ............... 361/62 |
| 6,005,757 A | * | 12/1999 | Shvach et al. ................. 361/64 |
| 6,008,971 A | * | 12/1999 | Duba et al. .................... 361/64 |

OTHER PUBLICATIONS

Casains, R., "Automatic Operation of Distribution Network in Areas of Medium Load Density," International Conference on ELectricity Distribution, London. IEE Contr. Pub.#99 (1973), pp 191–196.

Joslyn "Sectionalizers" advertisement. Joslyn Hi–Voltage Corporation, D.B. 750–202, Jun. 1996, pp 1–8.

Cooper "Sectionalizers" advertisement for Electronically Controlled, Manually Closed, types GV and GW, cooper Power Systems, Electrical Apparatus 270–20, Oct. 1991, copyright 1990 Cooper Industries, Inc., pp. 1–15.

Cooper "Sectionalizers" advertisement for Hydraulically Controlled Types GH, GN3, GN3V, Cooper Power Systems, Electrical Apparatus 270–20, Oct. 1991, copyright 1990 Cooper Industries, Inc., pp. 1–15.

Cooper "Sectionalizers" advertisement for Hydraulically Controlled Types GH, GN3, GN3V, Cooper Power Systems, electricla Apparatus 270–10, Jan. 1990, copyright 1990 Cooper Industries, Ind., pp. 1–13.

"Model 2800S Switch Control, Model 2801S Automatic Sectionalizer control" Operation Guide (Preliminary), EnergyLine Systems, Ins., Doc. 2800S/2801–003, Sep. 3, 1992, pp. 1–30.

Roberts, J., Zimmerman, K., "Trip and Restore distribution Circuits at Transmission speeds", Oct., 1998, pp. 1–29.

Schweitzer, E. III, Behrendt, K., Lee, T., "Digital Comunications for Power System Protection: Security, Availability, and Speed", Oct. 1988, pp. 1–24.

* cited by examiner

METHOD AND APPARATUS FOR AUTOMATED RECONFIGURATION OF AN ELECTRIC POWER DISTRIBUTION SYSTEM WITH ENHANCED PROTECTION

RELATION TO PREVIOUS APPLICATION

This application claims priority to provisional patent application Ser. No. 60/119,855 filed on Feb. 12, 1999. In addition, this application is a continuation-in-part of application Ser. No. 09/294 588 filed on Apr. 20, 1999, and now U.S. Pat. No. 6,111,735, which is a continuation of U.S. Ser. No. 08/978,966 filed Nov. 26, 1997, now U.S. Pat. No. 6,018,449 issued on Jan. 25, 2000.

BACKGROUND OF THE INVENTION

1. Field of the Invention

The present invention generally relates to improvements in control of an electric power distribution system, and more specifically to the use of intelligent autonomous nodes for isolating faulted sections of distribution lines, reconfiguring, and restoring service to end customers (circuit reconfiguration), and improving circuit protection.

2. Description of Related Art

The power distribution systems of this invention are generally of low to medium-voltage distribution feeders (ranging from approximately 4 KV to 69 KV) originating in power distribution substations and leading to the source of supply for end customers of an electrical supply utility or agency. Although the electrical principles governing operation of these feeders are identical to those governing the operation of the higher voltage generation and transmission systems, the methodologies for building, operating and maintaining the lower voltage systems are different. These methodologies are dictated by much larger quantities and geographical dispersion of distribution equipment, and by much lower quantities of electrical power supplied per mile of circuit. This creates requirements for lower cost, modular, standardized equipment, which can be installed, operated and maintained with minimal labor and human supervision.

Failures of the distribution feeder (faults) occur due to downed power lines, excavation of underground cable or other causes and are typically detectable by sensing excess (short circuit/overcurrent) current, and occasionally by detecting loss of voltage. In distribution systems, it is sometimes the case that a loss of voltage complaint by the customer is the means by which the utility senses the outage, responding by dispatching a crew to isolate the fault and reconfigure the distribution system. The typical devices for isolating these faults are circuit breakers located primarily in distribution substations and fuses located on tap lines or at customer transformers. The substation breakers are generally provided with reclosing relays that cause the breaker to close several times after the breaker has detected an overcurrent condition and tripped open. If during any of these "reclosures", the fault becomes undetectable, service is restored and no extended outage occurs. Particularly on overhead distribution lines, temporary arcing due to wind, lightening, etc causes many faults. Thus, the majority of faults are cleared when the breaker opens and service is restored on the automatic reclose. Alternatively, after some number of reclosure attempts, if the overcurrent condition continues to be present, the recloser goes into a "lockout" state which prevents further attempts to clear the fault.

Other than manually operated switches, most distribution feeders have no other means to isolate a fault between the substation and the fuses, thus any failure of the feeder results in lengthy, costly, inconvenient and potentially dangerous outages. The primary exceptions to this involve the use of devices known as "line reclosers", "interrupters" and "automatic line sectionalizing switches" or "sectionalizers". These are automatically operated devices, well known to those skilled in the art, and are referred to categorically in this document as "fault isolating devices". The reader should be aware that the term "sectionalizer" refers to a specific family of automatic, fault isolating devices described below, while the terms "sectionalizing" and "sectionalize" are used to describe the process of isolating a faulted section of line, which can be performed by all of the classes of switches described above.

The "line recloser" is typically a pre-packaged, version of the substation breaker with reclosing relay. Line reclosers typically consist of a fault-break switching device with integrated current sensing, plus a control enclosure containing fault detection hardware, control logic, user interface module, and battery-backed power supply. When placed on the distribution line between the substation and customer loads, a line recloser is typically set up with fault detection settings coordinated to operate before the substation breaker trips and to correspondingly prevent the substation breaker from tripping. This has the effect of reducing the number of customers affected by an end of line fault. On very long feeders, the more sensitive settings can be used to protect the feeder from faults of a magnitude too low to be detected reliably by the substation circuit breaker. Multiple line reclosers can be placed on a distribution line in series, although it becomes increasingly difficult or impossible to coordinate their settings such that only the nearest recloser on the source side of the fault operates.

The "interrupter" is typically a pre-packaged breaker and fault relay without automatic reclosing capability. Interrupters are used primarily in underground power distribution systems.

The "automatic line sectionalizer" or "sectionalizer" is typically a prepackaged combination of a load-break switch used in conjunction with a device known as a "line sectionalizer control". The sectionalizer senses current (and optionally voltage) such that the operation of the circuit and the source-side protective device can be monitored. The sectionalizer is configured to open its switch under certain circumstances when the circuit is de-energized after some number of pre-configured voltage losses have occurred within a brief time interval. The circumstances vary from product to product, but are always based upon sensing of conditions caused by faults followed shortly by voltage losses. Sectionalizers are designed to coordinate with the operation of the circuit's protective devices. Typical sectionalizers are devices such as the Cooper Power Systems Sectionalizer type GV or GW manufactured by Cooper Industries, Inc, or the EnergyLine Systems Model 2801-SC Switch Control manufactured by EnergyLine Systems. These are all well-known devices within the industry, and thus need not be described in detail herein.

Although utility acceptance of more sophisticated automation solutions to fault isolation and reconfiguration has been limited, many methods have been developed and marketed. The most primitive methods have typically involved placing control equipment and switchgear at strategic points in the power distribution grid and coordinating their operation entirely with the use of circuit parameters sensed and operated on locally and independently at each point. An example system of this type is the Kearney FILS system. More sophisticated methods have been developed for isolating/reconfiguring these circuits by communicating information sensed locally at the strategic points to a designated, higher level control entity(s). Example methods of this type are disclosed in U.S. Pat. Nos. 5,513,061 and 5,701,226 (Gelbein) and 5,341,268 (Ishiguro). Utilizing intelligent, distributed control methodologies, several methods have been developed to isolate/reconfigure distribution circuits without the need for the higher-level control entity (s). In systems implementing these methods, information is sensed and processed locally, acted on as much as possible locally, and then shared with other cooperating devices to either direct or enhance their ability to take action. Examples of these methods can be found in U.S. Pat. Nos. 3,970,898 (Baumann) and 5,784,237 (Velez), and in a prior version of EnergyLine Systems IntelliTEAM (Reg. T.M.) product and related U.S. Pat. No. 6,018,449 (Nelson et al).

Most of these methods and systems contain significant restrictions on the power distribution equipment types and topologies supported. For example, Baumann, Velez, and Gelbein disclose methodologies tailored to non-fault break sectionalizing switches with breakers or reclosers only at the sources of supply. Thus, methodologies for integrating substation breakers, line reclosers, sectionalizers, and other equipment into generalized, automatic circuit reconfiguration systems have been limited. There are numerous reasons for this, related primarily to the nature of electric distribution systems:

1. Without communication equipment, it is difficult, if not impossible to coordinate the protective and fault isolation functions of more than two or three devices.
2. Communication equipment is costly or limited in capability, and the techniques for managing the information flow and sequence of events are primitive. This also adds labor to the setup and support of such systems.
3. The load density/diversity, differing wire sizes and intermixed construction techniques (overhead/underground) and inherently unpredictable loading patterns greatly complicate the automation of emergency switching decisions.
4. Generally, there is more than one alternate source of supply, but the source may have limited capacity to supply the feeder. This requires a more complex decision making process.
5. Even when there is only one alternate supply, and that supply is fortuitously placed at the end of the line, limitations on the current carrying capacity of the main feeder can limit the reconfiguration process.
6. The limited training and background of emergency crews requires that the equipment be easily operated in both automatic and manual operating modes.
7. The technology of protective relaying and reclosers has advanced to incorporate microprocessor-based technologies, and existing reconfiguration system solutions incorporating reclosers do not take advantage of the advanced capabilities of the microprocessor governed devices.

Examples of recent improvements in recloser technology include the Form 4c and Form 5c Recloser Controls manufactured by Cooper Industries, the SEL 351R Recloser Control manufactured by Schweitzer Engineering Laboratories, Inc. and the N, U, and W Series Recloser Controls manufactured by Nu-Lec Pt. Ltd. These products are capable of internally maintaining at least two separate sets of protective relay settings, selectable by the customer at the front panel or over communications. These sets of settings can be loosely referred-to as "profiles" of protection characteristics, and may include a wide variety of selections including operating modes, protection features enabled, and level settings. In the case of the SEL 351 R, the capability exists to modify profile settings based upon a procedural language and communication with external devices, although the specific methodology and details of doing this are left to the end user. A key attribute of these profiles is the amount of load and distance (or "reach") down the distribution line that can accommodated with reliable detection of the overcurrent fault.

SUMMARY OF THE INVENTION

A primary aspect of the present invention is to provide methodology and related system apparatus for using and coordinating the use of information conveyed over communications to dynamically modify the protection characteristics of distribution devices (including but not limited to substation breakers, reclosing substation breakers, and line reclosers). In this way, overall protection and reconfigurability of the distribution system or "team" is greatly enhanced.

In another aspect of the invention, devices within the system in accordance with the present invention recognize the existence of cooperating devices outside of the team's domain of direct control, managing information from these devices such that more intelligent local decision making and inter-team coordination can be performed. This information may include logical status indications, control requests, analog values or other data as will be presented below.

These and other purposes and advantages of the present invention will become more apparent to those skilled in the art from the following detailed description in conjunction with the appended drawings.

DETAILED DESCRIPTION OF THE PREFERRED EMBODIMENT

The present invention comprises novel improvements to a method and system for controlling an electric power distribution system. The following description is presented to enable any person skilled in the art to make and use the invention, and is provided in the context of particular applications and their requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest possible scope consistent with the principles and features disclosed herein.

Figure 1:
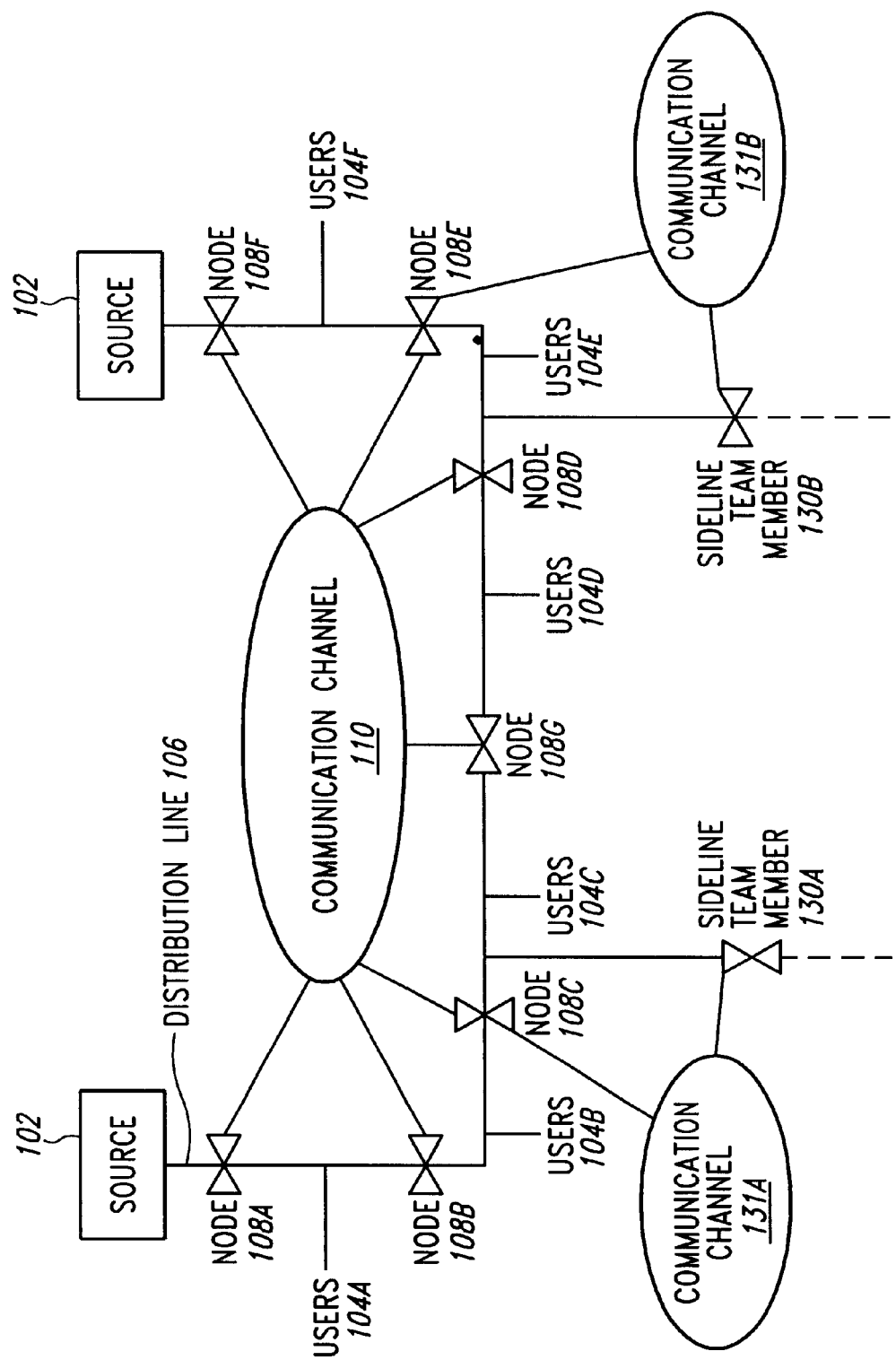
FIG. 1 shows a conventional distribution system in which nodes in accordance with a presently preferred embodiment of the invention have been installed.

FIG. 1 shows a simplified view of a portion of an exemplary electrical power distribution system that can be controlled by a preferred embodiment of the present invention. The distribution system comprises a plurality of sources of electrical power 102 connected to a plurality of users 104 (e.g., factories, homes, etc.) through an electrical distribution line 106 such as conventional electrical power lines. Distribution line 106 has a plurality of nodes 108 placed at predetermined points along the line 106. The depiction of the number of sources, users, lines and nodes in FIG. 1 is arbitrary and there may be a different configuration or number of each of these components in any given distribution system.

Figure 2:
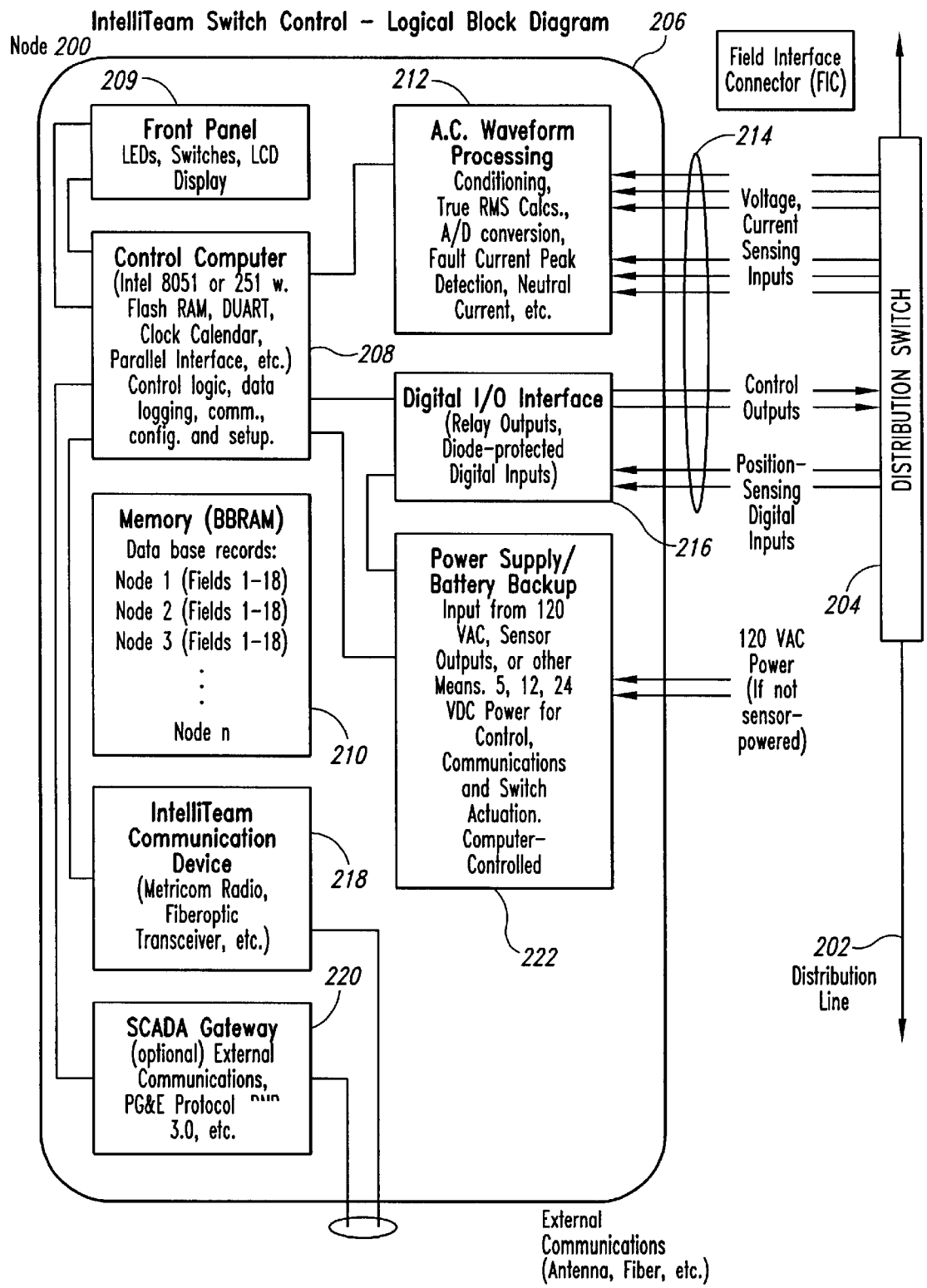
FIG. 2 is a block diagram of a node of a preferred embodiment of the present invention.

In addition, while the system disclosed in U.S. patent application Ser. No. 08/978,966 is well suited to making decisions based upon the local configuration of, and sensed conditions on the main distribution line, the present invention enables devices within the system team to recognize the existence of auxiliary or "sideline" devices (for example, 130A and 130B) outside of the team's domain of direct control, actively maintaining information from these devices such that more intelligent local decision making and inter-team coordination can be performed. Correspondingly, devices within the team may be configured to supply information over communications channels, (for example, 131A and 131B) as sideline team members of other teams. This information may include logical status indications, control requests, analog values or other data. FIG. 2 depicts a presently preferred embodiment of a node 200 in accordance with the invention. Distribution line 202 passes through switch 204 which can open and close the distribution line at this point. In other embodiments of the invention, the switch 204 can be replaced by other devices capable of performing power sensing, control or conditioning functions such as voltage regulation (voltage regulators) reactive power control, (switched capacitor banks), fault sensing, etc.

It will be appreciated that consistent with the present invention, the node 200 may also be of a type for controlling two (dual), three, or more switches, with customer loads or alternate sources between the switches. In this case, the distribution line 202 would pass through two or more switches 204 which can open and close independently under the control of the single node 200. In this context, node 200 is a single node from the standpoint of communications, but is multiple nodes from the standpoint of the power system and the control algorithms of the present invention. In this circumstance, the information flow is unchanged, but the communication step is simply bypassed.

Node controller 206 controls distribution switch 204. Node controller 206 includes a control computer 208, a display 209, and an associated memory 210. Memory 210 stores the programming to control the node and stores the database of node records about each node in the system. A significant feature of the present invention is the addition of information elements 17–18 in the node records 210 to reflect protective characteristics of the node as explained below.

A significant feature of the present invention relates to enhancements to team operation when node 200 has protective (overcurrent protection/fault break) capabilities. Those skilled in the art will recognize that distribution switch 204 can have different operating capabilities which may enhance or detract from its ability to participate in circuit reconfiguration. For example, the lowest-cost switches may not be capable of interrupting high currents, or may not be outfitted with both voltage and current sensors. Those skilled in the art will also recognize that node 200 may be programmed not to open the switch under high interrupting currents (sectionalizing switch control), or alternatively may be programmed as a "circuit protective device" (recloser or breaker). When programmed as a protective device, he switch is opened under overcurrent conditions (fault current) to prevent fire or damage to the circuit or to customer equipment, and also for safety concerns.

It is a primary aspect of the present invention to provide methods and apparatus having generalized algorithms (see generally FIGS. 3 and 6–8) for using and coordinating the use of information conveyed over communications to dynamically modify the protection characteristics of distribution devices (including but not limited to substation breakers, reclosing substation breakers, and line reclosers). In this way, overall protection and reconfigurability of the distribution system or "team" is greatly enhanced. These modifications vary in scope from adjustments in protection settings or feature selections to redefinition of the device capabilities. For example, under certain circumstances, the automated control methodology can redefine the role of a line recloser into a line sectionalizer or into an entirely non-automatic switch to reduce problems with coordination between multiple protective devices. Since the algorithms are applied dynamically, there is no need to customize the procedural operation for each circuit configuration. Since each device automatically recognizes its role within the team, coordination of the protective devices is greatly facilitated by the improvements detailed below.

Control computer 208 is connected to AC waveform processor 212. AC waveform processor 212 is connected through field interface connector 214 to distribution line 202. This allows the processor to measure various critical parameters of the electricity on the distribution line such as, voltage and current, digitally convert them, and send them to the control computer for processing, communications, or storage in memory.

Digital I/O interface 216 is connected to control computer 208, switch 204 and distribution line 202. Digital I/O interface 216 allows computer controller 206 to receive switch position sensing information and other inputs, and to output control outputs to the switch.

Communications device 218 is connected to control computer 208 and allows it to communicate with other nodes on the system through communications channel 110 of FIG. 1. The communications devices can be connected to any communications network that is conveniently available and has the desired characteristics. In a current embodiment of the invention, a Metricom Radio is used.

A second, optional, communications device 220 can be included in the node, if desired, for use by systems other than the present invention. An example of this would be a SCADA gateway.

Power is supplied to the node through power supply/ battery backup 222. The battery can be charged from solar power, an AC potential transformer, or from power supplied through the voltage sensors.

Each of the nodes is connected to a communications channel 110. Any type of communications channel can be used. In the present invention, for example, the communications channel could be telephone, radio, the Internet, or fiber optic cable.

Figure 3:
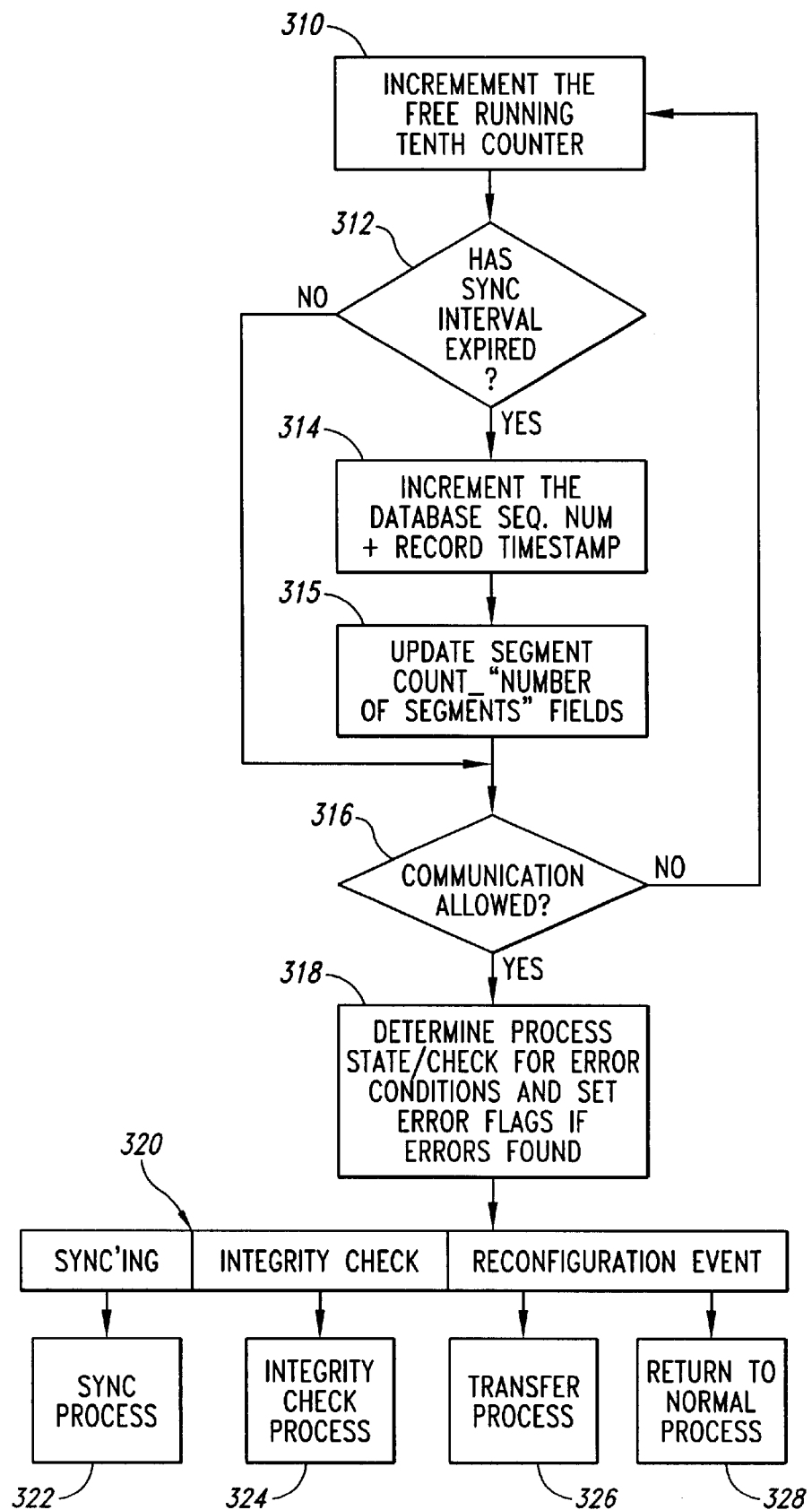
FIG. 3 is a flow chart showing the synchronization and error checking routine employed by the embodiment of FIG. 2. This routine is called by various other portions of the system flow diagram and updates the clock and counters used to synchronize the system.

FIG. 3 is a flow diagram which illustrates the operation of a synchronization counter and state selection process run by each node in accordance with the presently preferred embodiment. In this process the nodes update their timer and database sequence counter which are used to synchronize the nodes with each other. The nodes then check for error conditions and set error flags if errors are found and determine from their database which state they are in: synchronization, integrity check, or reconfiguration event. An enhancement to the synchronization process is the addition of step 315 to provide protective devices with "advance notice" of their protective characteristics prior to a reconfiguration even such that initial restoration of the circuit may begin prior to adjustment of protective device profiles if the prior settings are adequate.

Figure 4:
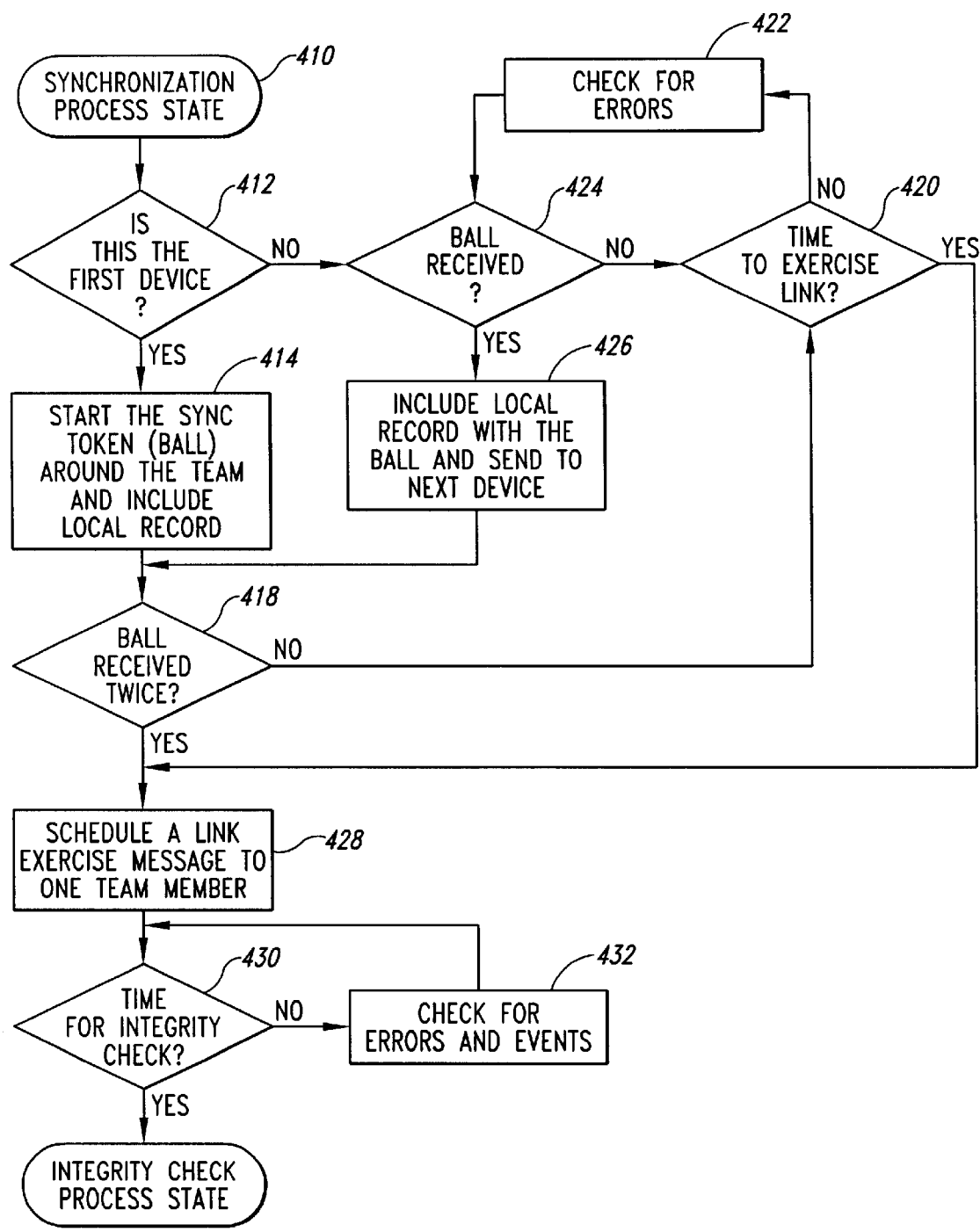
FIG. 4 is a flow chart showing the synchronization process state of employed by the embodiment of FIG. 2. This routine coordinates the transmission of the database among the nodes.

FIG. 4 is a flow diagram which illustrates the operation of the synchronization process state run by each node in accordance with the presently preferred embodiment. In this state the nodes construct a database of critical control information about the distribution system. All nodes contribute to the construction of a database. Each node stores in its memory a copy of the database. The steps in constructing the database in accordance with the presently preferred embodiment are as follows: each node receives the database from the previous node, adds its own record of information and passes the database on to the next node. This process continues until all nodes have received a record from every other node. Once this process is compete, each node then proceeds to the integrity check state shown in FIG. 5

Figure 5:
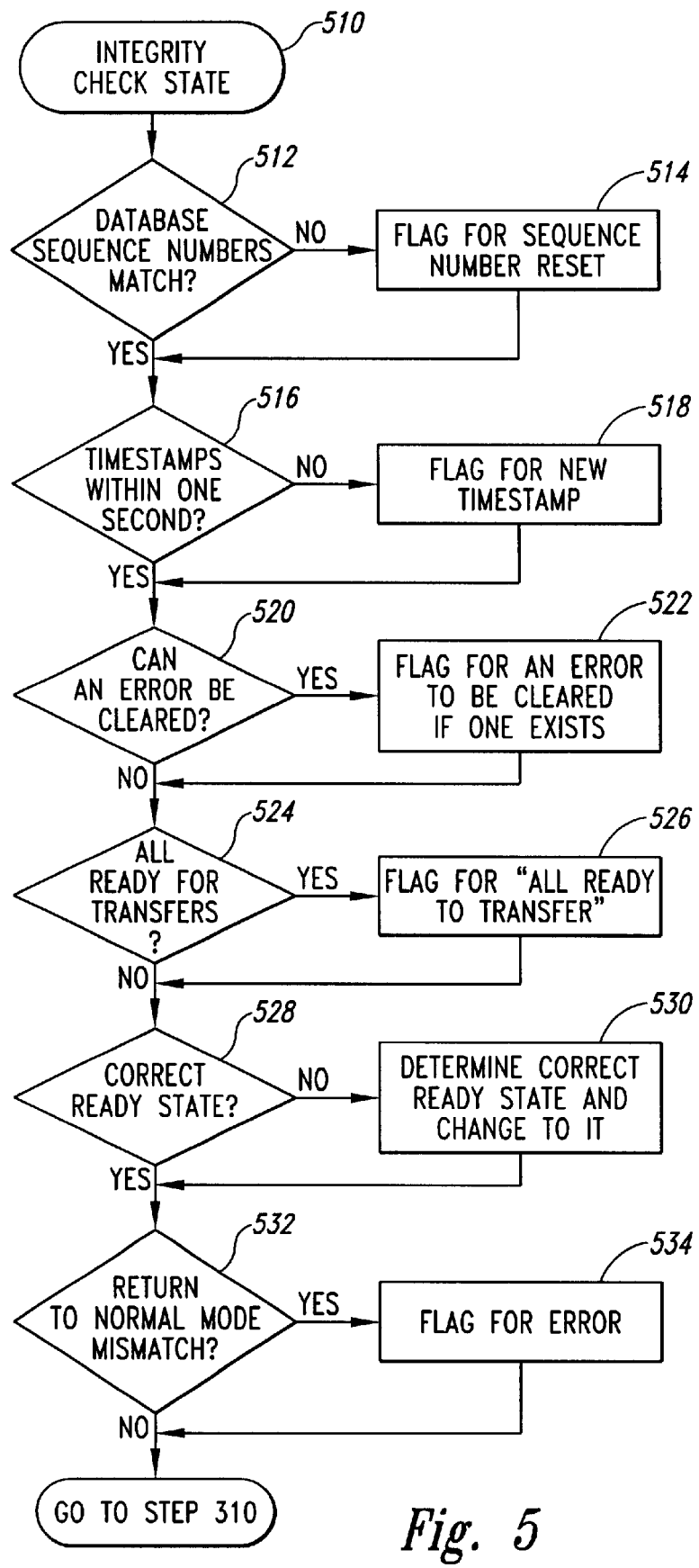
FIG. 5 is a flow chart showing the integrity check state employed by the embodiment of FIG. 2. This routine checks the database, error flags, and system state to ensure that the node is operating correctly and the data is reliable.

FIG. 5 is a flow diagram which illustrates the operation of the integrity check state process run by each node in accordance with the presently preferred embodiment. When a node runs this process, it checks the records it has received from all the other nodes to ensure that the records reflect a timely version of the state of the system.

Figure 6A:
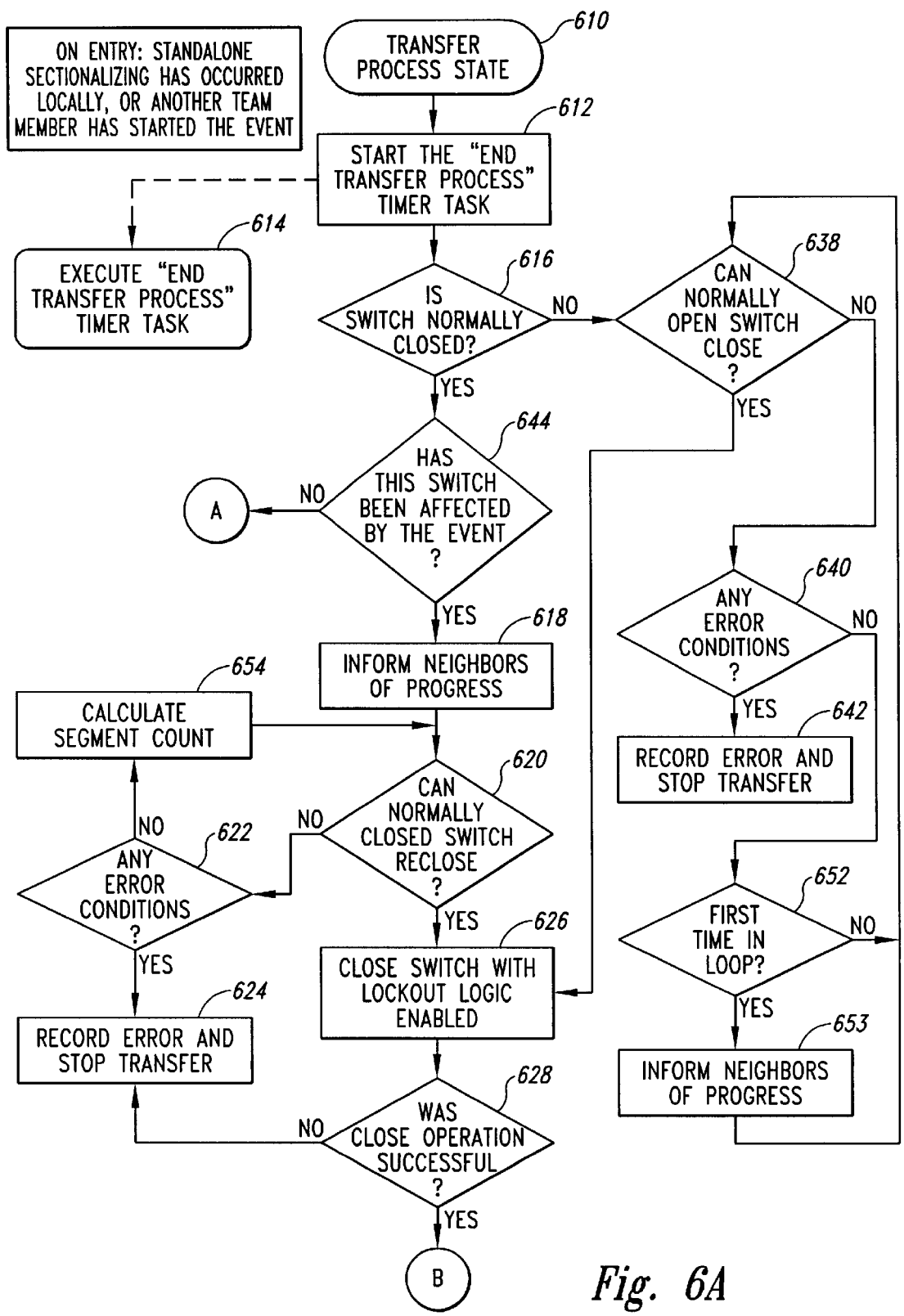
FIG. 6 is a flow chart showing the transfer process state employed by the embodiment of FIG. 2. This routine closes open switches after a fault occurs in order to restore service to as many users as possible.
Figure 6B:
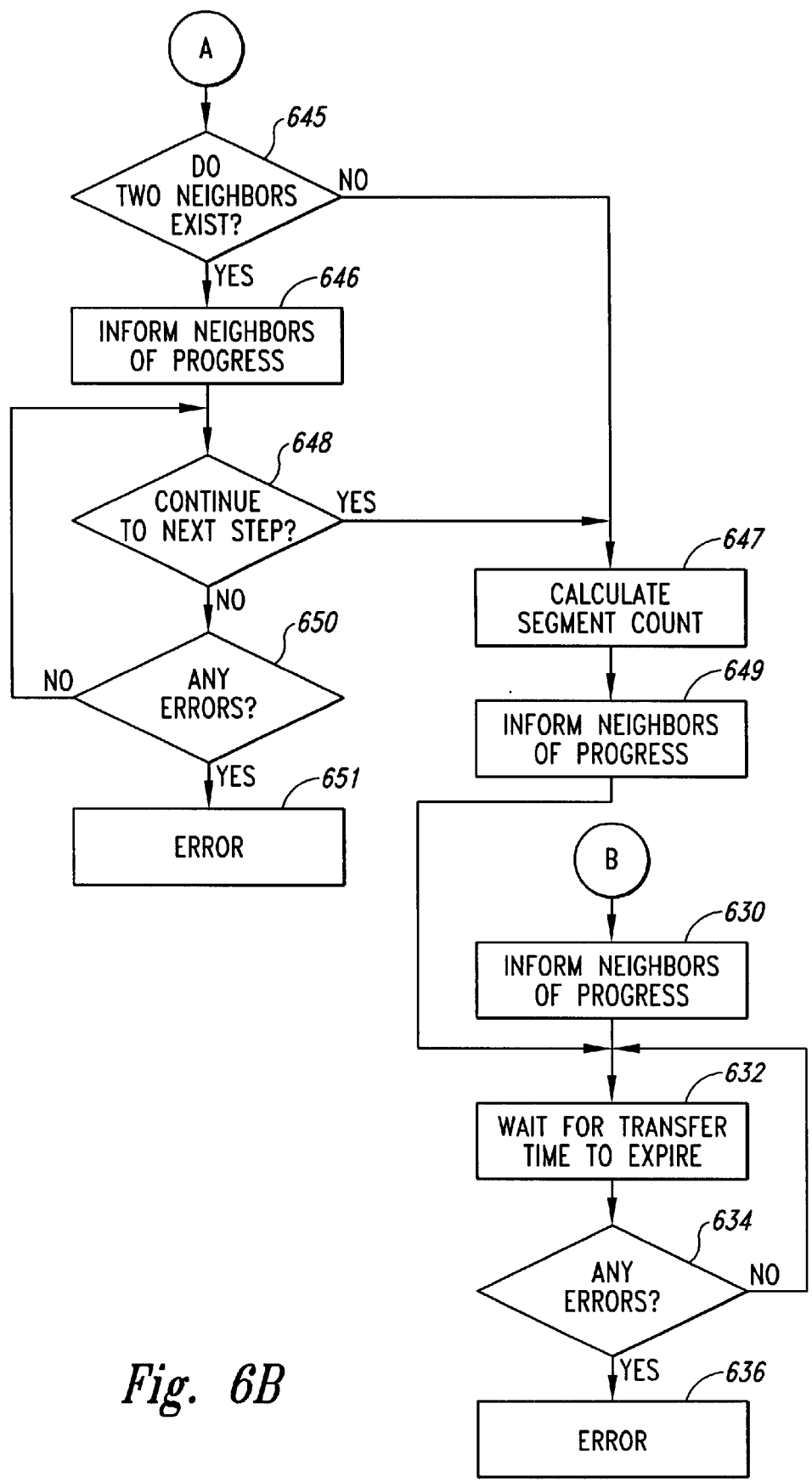

FIG. 6 is a flow diagram which illustrates the operation of the transfer process state in accordance with the presently preferred embodiment. This flow diagram describes the process used by each node upon the occurrence of a fault in the system followed by standalone sectionalization. This process is also started in a node when the node receives a message that another node has entered this process. In order to restore electric power service to as many users as possible after a fault has occurred, each node will use this process to determine if it can close its associated switch(es). The present invention extends the functionality of the transfer logic to insure that the protection settings match the requirements of the transfer (steps 645–654).

Figure 7A:
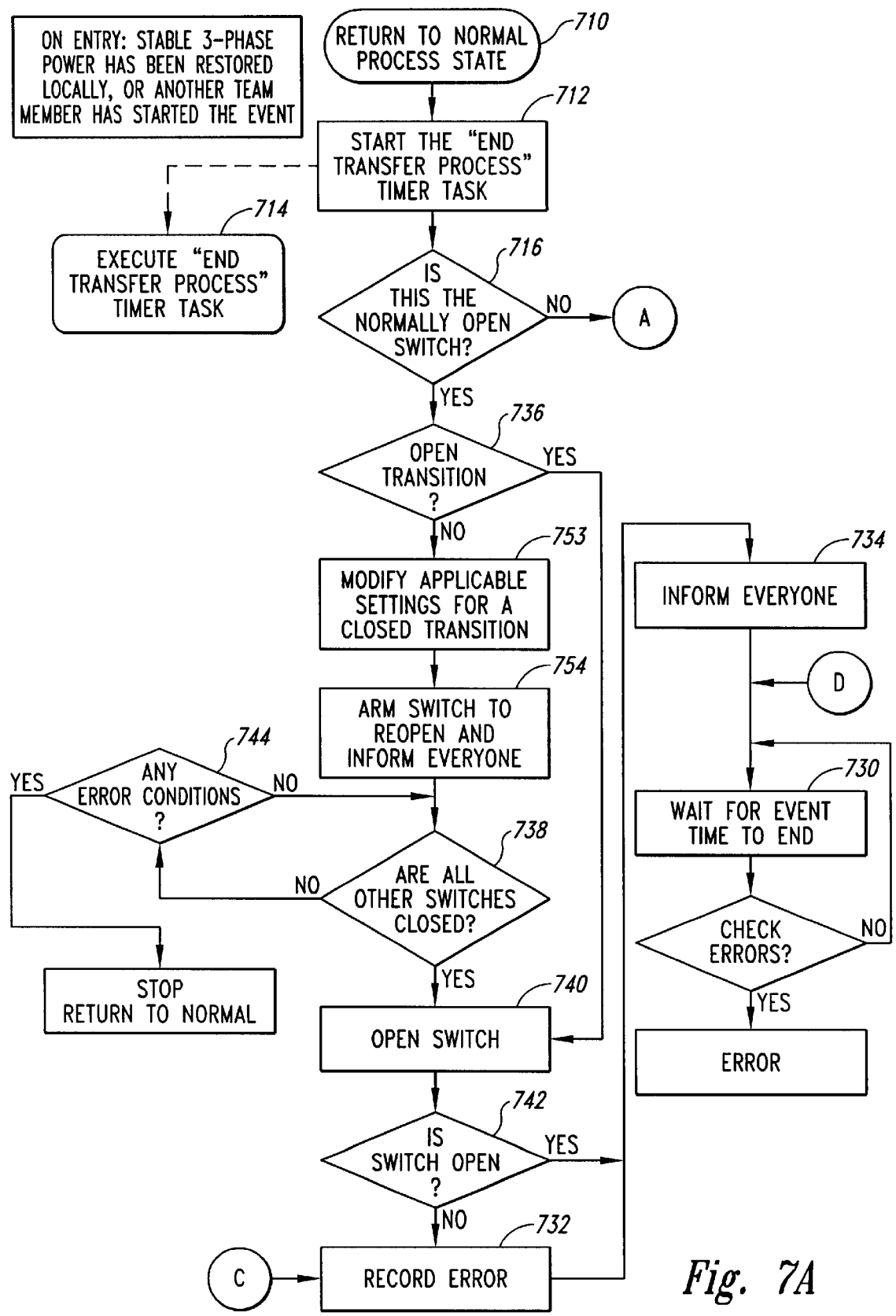
FIG. 7 is a flow chart showing the return to normal process state employed by the embodiment of FIG. 2. This routine returns the nodes to their normal state once a fault has been cleared.
Figure 7B:
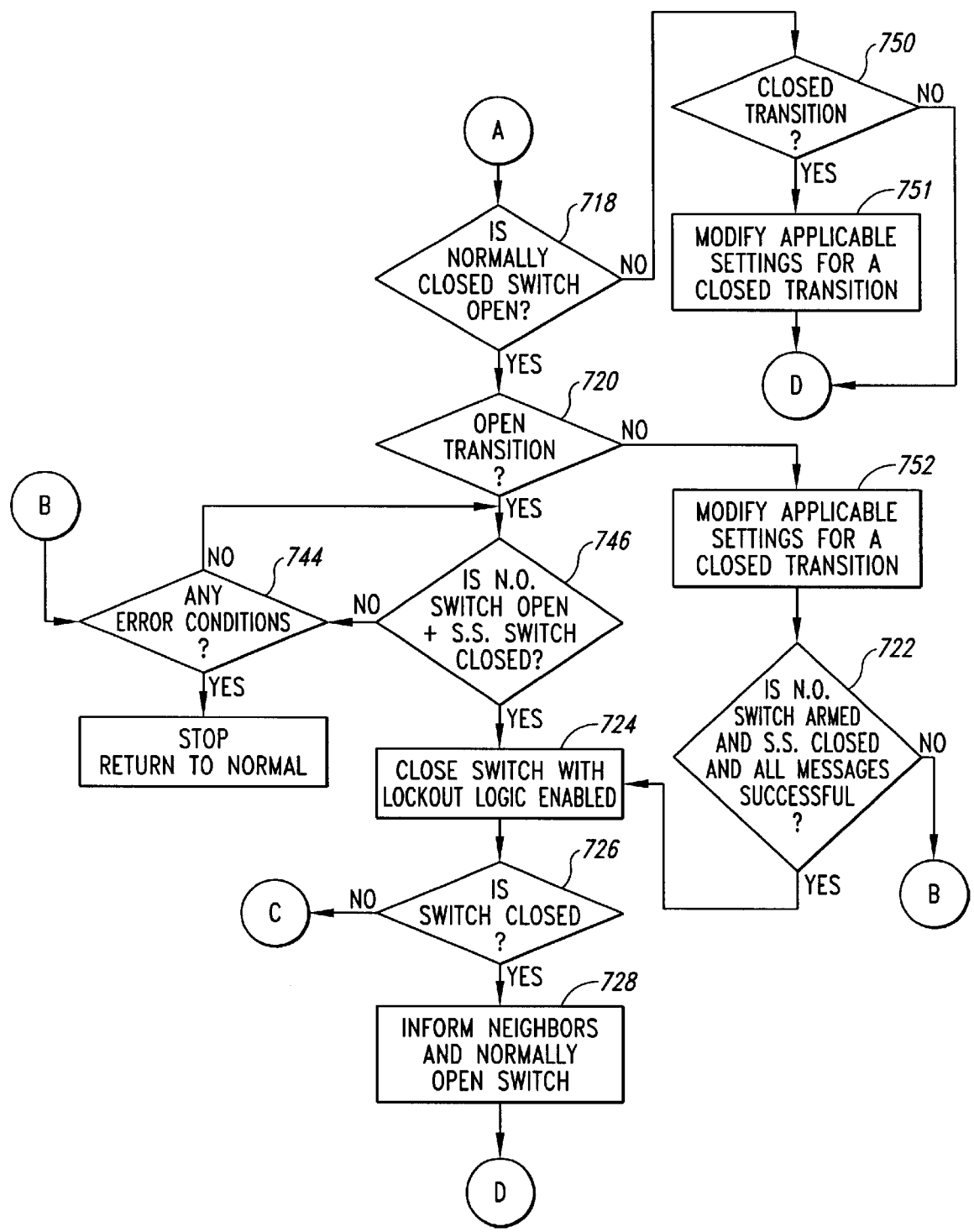

FIG. 7 describes the logic used by each node to return the distribution system to its normal state once the fault has been cleared. The present invention extends the functionality of the return-to-normal logic to insure that the protection settings match the requirements of the return-to-normal transition, particularly when the "closed" transition is used (steps 722 and 750–752).

Figure 8:
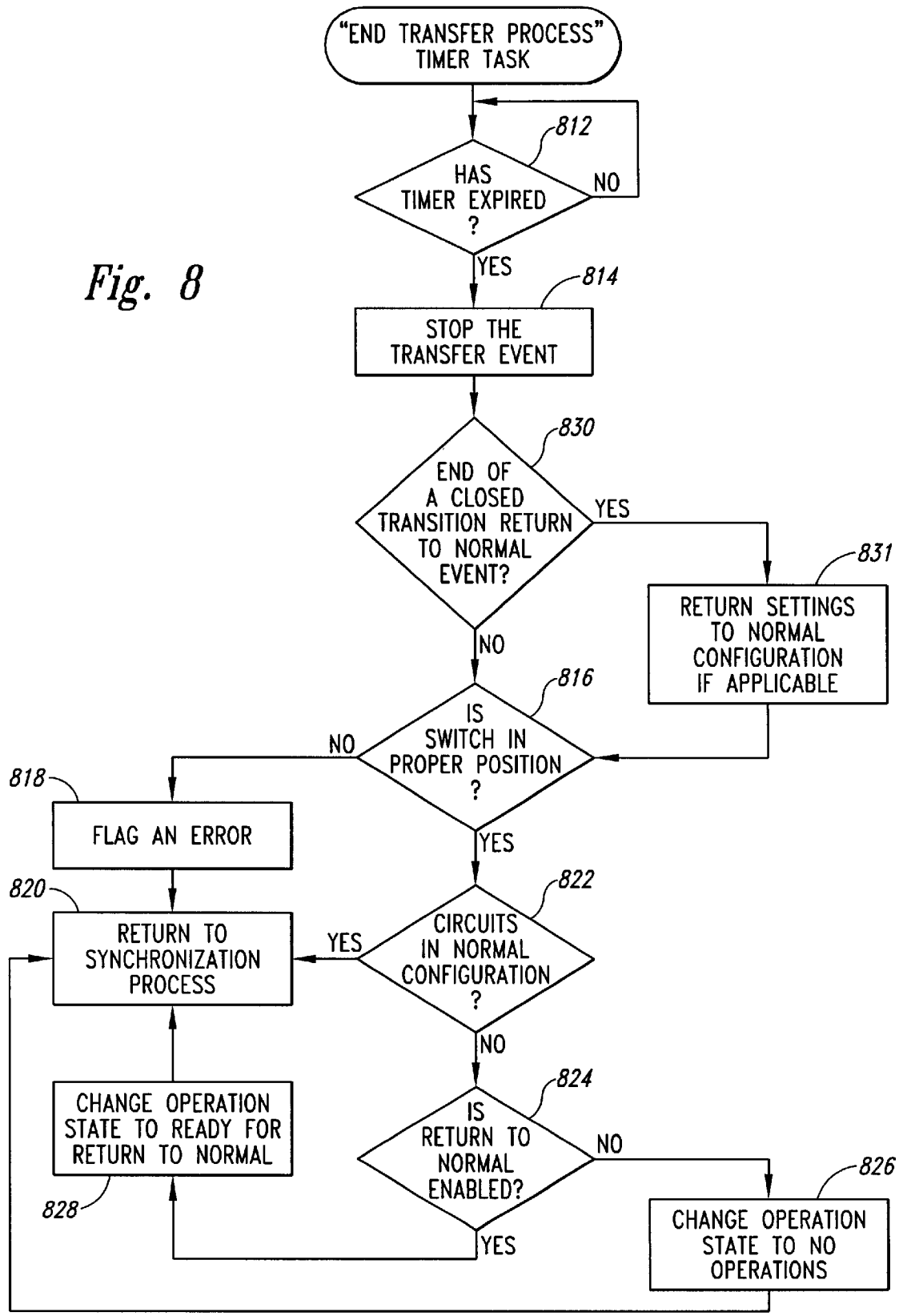
FIG. 8 is a flow chart showing the end process timer task employed by the embodiment of FIG. 2. This routine is called by either the transfer process state flow chart or the return to normal flow chart and sets a timer to ensure that the performance of these tasks does not exceed a predetermined time duration.

FIG. 8 is a flow diagram which illustrates the operation of a task timer that is used during the transfer process state of FIG. 6 and the return to normal process state of FIG. 7 in order ensure that the system does not take too much time to complete the steps required in either of these processes. The present invention extends the functionality of the return-to-normal logic to reset the protection settings when the return-to-normal transition, and in particular when the "closed" transition return-to-normal is used (steps 830–831).

Management of the Team Database

As mentioned above, memory 210 stores the programming to control the node and stores a database of node records about each node in the system (team database). Each record includes a number of fields which include information that allows the node controller to control the node's switch(es) to alter the distribution line characteristics in response to distribution system demands. A major improvement in the present invention is the addition of protective characteristics to the team database, facilitating coordination of protection settings during load transfer/restoration.

In a preferred embodiment of the invention the ordering of the node records in the database corresponds to the physical ordering of the nodes in the distribution system. It would not deviate from the present invention to have the node records in the database ordered in some other fashion and to include information in each node record of the node's actual or relative physical position in the distribution system. If the node controller is of a dual or multiple switch type, the position of each switch is represented in the database and may be ordered independently.

In another embodiment of the present invention, a single, dual or multiple switch node from the standpoint of communications can be used as the only member of the team. It will be seen that doing so is completely consistent with the preferred embodiment of the invention. A dual switch node may act as the only member of the team when it is the only member physically installed (other members may be installed later), when other members of the team have been temporarily removed from the team, or when errors at other nodes in the team prevent the entire team from acting upon an outage condition.

Also, a preferred embodiment of the invention is for controlling a loop distribution system as in FIG. 1 in which there are two sources and a normally open switch (a "tie" switch) in the distribution line between the two sources, or a radial distribution system in which there is one source and no tie switch. It would not deviate from the present invention for the database to represent simpler or more complex distribution system topologies and for the invention to be able to work on such topologies.

In the preferred embodiment, the tie switch can close to restore load (backfeed) from either side, depending on which side of the switch is energized and which side is deenergized. As a convention, the circuit is described as having a "right" side and a "left" side, with the tie switch between the right and left sides. The lowest numbered node is designated as being closest to the source on the left side of the circuit, and the highest numbered node as being closest to the source on the right side. The circuit traversed between each of two adjacent nodes is referred to as a "transfer segment" or "segment".

In the preferred embodiment of the invention, each node's database record includes: (1) record currently in use flag, (2) indication of the type of device represented by each individual record, (3) the node's communication address, (4) its normal switch(es) state(s) (open or closed), (5 present switch (es) state(s), (6) the voltage state (is voltage present on the line or not)(by position if applicable), (7) the fault state (has a fault been detected)(by position if applicable), (8) the present time stamp (9) the database sequence number, (10) the logic process state (what state and step is the switch in), (11) error condition status flags, (12) automatic/manual operation mode status (by position if applicable), (13) average of the sensed loads on each phase (by position if applicable), (14) time stamp at start of event process, (15) indication of method of return to normal (open or closed transition), (16) indication of whether the node was within the affected portion of the circuit, (17) maximum number of segments that can be adequately protected with the current protective settings when feeding the circuit from the left side, and (18) number of segments that can be likewise protected when feeding the circuit from the right. For the purposes of this invention, a segment (see items 17 and 18 above) represents the distribution line between two adjacent team nodes of FIG. 1. In the case of a single communication node containing dual or multiple switches, the number of segments counts the load between any two switch positions along the main distribution line as an additional segment. The "maximum number of segments" is obtained using a methodology outlined below. It will be appreciated that in other implementations of the invention different node data may be stored in the database record for each node without departing from the scope of the invention.

The team local record database (above) allows each node to have enough information about the state of the distribution system to intelligently control its local switch. Additionally, since the database is locally stored in the node, the node need not ask other nodes for information or wait to receive operating instructions from other nodes.

It will be appreciated that consistent with the present invention the record currently in use flag can be used to remove a node from coordinated system activities or allow a node to resume coordinated system activities. The decision to remove or resume activity of a node may be made by, but is not limited to an external decision making entity, or by the node itself.

Protection Profiles and the Team Database

A significant improvement in the preferred form of the present invention is the representation of additional attributes in the protective device profiles. These attributes enhance the ability of the protection engineer to convey the intended operating range or purpose of the settings to the team nodes. In addition, these attributes support additional, team-related functionality not otherwise represented in the protection settings of the individual device as will become clear below. The attributes are: (1) "Profile Type" Indicates the intended use of this profile. For the preferred implementation, the possible values are: (a) "Team Mode/ Normal" for use when the nodes are in their normal operating state, with the normally open switch open, and all others closed. In the preferred embodiment, there is only one Team Mode/Normal profile, although it would not deviate from the scope of this invention to have multiple profiles, selected dynamically based upon operating parameters such as the season of the year or load-based criteria. (b) "Team Mode/Transfer" for use in circumstances where additional segments or load must be picked up or carried at this device and the normal profile is inadequate. There may be multiple Team Mode/Transfer profiles, selected for use based upon various selection criteria discussed below. (c) "Standalone" when team operation is not enabled, or is temporarily disabled due to persistent errors or problems (these are referred to below as "Stop Transfer" conditions). (d) "Team Mode/Return to Normal" for use during a "return to normal" team operation (see below). (2) "Number of Segments, Left-Side Distribution" Indicates the maximum number of additional segments, beginning at the local switch position, that can be protected by the profile when power is being fed from the left hand side of the circuit. This number may assume a value greater than the direct reach of the device if the system includes other protective devices with profiles that protect the end of line. In this case, if the other devices are team members, one of the features of the present invention is to maintain consistency among the profiles. (3) "Number of Segments, Right-Side Distribution": As above, but for power fed from the right side. (4) "Maximum Load" Indicates the maximum amount of customer load that the profile is intended to protect. This value is typically predefined by the user and compared against real time load data to insure that the profile is not used in circumstances where false tripping of the protective device could occur. (5) "Protection Selection Key": This is an index or internal pointer to the actual configuration settings associated with the profile. This index allows the user-specified entries to be linked to a collection of device settings either preloaded in the device or maintained as a separate database. Those skilled in the art will be able to appreciate other attributes and attribute values that could be used to characterize the configuration of protective device settings.

It is an object of the present invention to enable team members to decide whether or not the protective settings of other team members require adjustment before additional load can be picked up by closing open switches. Thus, the "number of segments" fields in the local record must be locally determined and shared between team members. This process takes place periodically during normal operation whenever the team database is exchanged ("sync" process, FIG. 3, Step 315). A more complex process is involved in determining the values for the fields during error processing and/or transfer events and is discussed below.

Calculating the "Number of Segments" Field—
Normal Operation

The discussion below identifies the way that the "number of segments" fields are calculated for the presently active profile during normal team operation exclusive of transfer and return-to-normal events or error handling. In the preferred embodiment, protective devices operate without team-invoked changes to their operating profiles unless a transfer or certain error conditions are present. It would not deviate from the scope or intent of this invention if changes to the active profile were made and coordinated throughout the team based upon seasonal variations, load or other sensed or conveyed information.

There are many possible ways for deriving the "number of segments" fields in the local record of the team database based on the type and capabilities of the device. The preferred embodiment uses the following methodology based upon the switch and control's inherent capabilities: Sectionalizing Switch: On initialization, the number of segments that can be protected is set to an indefinitely large number. When the team database or local record is transferred (during synchronization or during a transfer event), the count is reduced to the number of segments protected by the sectionalizer's source-side nearest adjacent node, decremented by one. For example, for the local record corresponding to the second node, if the first node can protect three segments on its load side when power is distributed from the left (left-side segment count), and the second node is a sectionalizing switch, it sets its left-side distribution segment count to two. If the third node's local record indicates that it can protect two segments beyond its position when power is distributed from the right, the sectionalizing switch at node two sets its right-side segment count to one. Special provisions must be made for the first node (left-hand distribution) and last node (right hand distribution), since they have no source side nodes. Three options are supported in the preferred embodiment for conveying the source-side segment count to the terminal (preferred and alternate source) nodes: (a) the count can be predetermined (configured) based upon worst-case loading protection studies for the circuit as seen by the source side protective device, (b) it can be predetermined to an arbitrarily high value (to defeat the prevention of additional circuit loading based upon inadequate segment count), or (c) it may be acquired over communications from the source side protective device (see sideline team member functionality below). The provisions above also apply when the terminal nodes are protective devices rather than sectionalizers (see below). Protective Device (Recloser or Breaker): Based on the protective settings of the device and the sophistication of the control, the number of segments may be configured or dynamically calculated based in part on the capabilities of the node as described below.

In the preferred embodiment, the breaker or recloser's active profile attributes are used in the derivation of the "number of segments" fields in the node's local record. The number of segments is calculated as the lesser of the number of segments protected by the source-side adjacent node (minus one), or the number of segments that can be protected based on the local device's active profile (the profile currently in use). In the later case, the most-recent load data stored in the team's local copy of the team's database is used to determine whether or not the potential, calculated load (based on real-time load data) corresponding to the number of segments handled by the profile exceeds the maximum load configured for the profile. If it does, the "number of segments" for the profile is reduced until the load can be handled. The logic for making this calculation must be sensitive to the load measured locally, as well as to the direction of present current flow (left or right), and the present measured load of each individual segment on the opposite side of the normally open switch. For example, for calculation of the number of segments for left hand distribution, if the count extends the protection one segment beyond the position of the normally-open switch, the measured circuit load at the switch to the right of the normally open switch would be added to the locally measured load for comparison with the profile. It will be appreciated by those skilled in the art, that the reduction of segments based upon load can be defeated if the end user configures an arbitrarily high value of the load current that can be carried through the node with the specified profile.

Selecting Profiles During Load Transfer or Error Processing

This process is invoked whenever the number of segments handled by the presently active profile is recalculated during a load transfer, return-to-normal, or error processing or recovery event. Updates to the team database during these events trigger a profile search/selection process. The process identified below is a simplified approach for selecting the appropriate profile, although it would not deviate from the scope of this invention to use a more elaborate process based on calculations of line impedance, line loading or other factors, or to trigger the selection process based on different events.

In the preferred embodiment, the events that trigger the selection process are: (1) Completion of a synchronization interval (see below) with no errors and a transition of the circuit configuration into its "normal" state, with all switches in their correct normally closed or open positions. This event causes the "Team Mode/Normal" profile to be selected. (2) Transition to a team "stop transfer" condition which causes selection of the "Standalone" profile, assuming the last known configuration of the circuit was such that all switches were in their specified "normal" positions. (Note: Other errors do not alter the selection of the presently active profile.) (3) Transition to the "return to normal" state (see below) causes selection of the "Team Mode/Return to Normal" profile. (4) During a transfer event (see below), detection that a transfer is in progress, and the maximum number of segments that the local switch will have to handle is greater than the number handled by the presently active profile.

In this latter circumstance, in the preferred embodiment, the node scans through the list of "Team Operation/Transfer" profiles searching for the first entry that can carry the maximum number of segments and pre-fault operating load. This allows the profile reselection process to occur at most, only once during typical transfers. It would not deviate from the scope of this invention to provide the nodes with additional information during the notification process regarding the location of the fault such that the profile selection could be more closely matched to the requirements. In addition, it would not deviate from the scope of this invention for the selection process (and associated communications) to be carried out each time a segment was picked up.

If the selection process above results in the need to change the actual protection settings or operating mode of the protective device, the change is initiated and verified. Only after positive verification is the local record in the team database updated. If the verification fails, an error condition is generated, and the logic reattempts the selection. If a transfer is in progress, this is repeated indefinitely until the transfer process times out.

Free Running Counter

Steps 310 to 318 of FIG. 3 comprise a synchronization routine that is often called by steps in other processes run by a node, especially when a node is waiting for a specified event to occur. In step 310 the node's free running tenth counter is incremented. A free running counter is used to establish a reference for time stamped logic. As will be seen shortly, these counters are used to ensure synchronization among the nodes. In step 312 the node checks the free running counter to determine if it has reached its maximum. When the maximum count is reached, the synchronization interval expires. If the synchronization interval has expired then step 314 is executed and the sequence number for the database recorded by the node is incremented and a time stamp is recorded in the node's database to help ensure synchronization. As an improvement provided by the present invention, at step 315 the preferred embodiment also calculates/recalculates the "number of segments" fields for both right hand and left hand distribution using the methodology shown above. The database sequence number is increased by one count on each synchronization interval and each node includes the database sequence number in its local record.

The database sequence number at each node should be the same if all of the nodes are properly functioning and synchronized. Therefore, the inclusion of each node's database sequencing number in its record allows nodes in the present invention to be certain that the data being received from other nodes is timely and reliable. In this way each node can ascertain for itself whether the system as a whole is functioning properly.

After step 314, or if the synchronization interval has not expired then the node checks to determine if communications are allowed. Communications will be prevented in certain situations. An example of when communications are not allowed in a preferred embodiment is when a team of nodes is initially being configured, all other nodes must be silent except for the node distributing the configuration information. If communication is not allowed for the node, then the node returns to step 310 and is in effect on its own for the moment.

If communication is allowed then step 320 is executed. The node will check for errors and events and set a flag if an error or event is detected. Then each node determines which of three states it is in: synchronizing, integrity check, or reconfiguration event. Each node determines on its own, independently of the other nodes, which of the three states it should be in based on its own internal sensors and the database records that it has received from the other nodes. Typically, all nodes will be in the same state unless the system is transitioning from one state to another. However, any particular node can only be in one state at a time.

Synchronization Process State

If the node is in the synchronization process state then it follows the process illustrated by the flow chart in FIG. 4. At step 412, the node must determine if it is the first active node. In a preferred embodiment of the invention the node just after either source can be configured to be the first active node in the database and the other node would be the last active node in the database. The nodes in between would be ordered in the database to reflect their physical ordering in the distribution system. It would not deviate from the present invention to have the nodes ordered in the database in an order other than their physical order and to include data in each node's record that allows the node's absolute or relative physical ordering to be determined.

The first node will proceed to step 414 and will start the process of constructing the database of records for the nodes. The first node will put its local record in the database and then send the database to the next node listed in the database. This database is called the "ball" as it is sent around the system from node to node. The record added to the database by each node contains the 18 items of information listed above for the currently passing node.

Although there are many possible ways that this database could be constructed and communicated, the present incarnation of the invention constructs the database by sending it to each successive node to have that node's record added onto the database. The database could be constructed in other ways without deviating from the present invention. For example, each node could simply broadcast its record on the communications channel for reception by all other nodes.

The first node will then continue on to step 418, and since the node has not yet received the ball twice, it will continue on to step 420. In step 420, the node determines if it is time to exercise its link. A node exercises its link by signaling another node to signal it back. This allows a node to determine if its communications system is working. To determine if it is time to exercise its link, a node checks the synchronization interval timer to determine if the synchronization process has taken more than a predetermined used defined period of time. This prevents the node from getting stuck in this state if there is a communications failure.

If it is not time to exercise the link, the node next goes to step 422. In this step the node executes steps 310 to 318 of FIG. 3 and checks for errors and events. If an error or event is detected, a flag is set and, if necessary, the process that is active is ended. This is called a "synchronization and error checking loop." Once this is completed, the node returns to the synchronization process and proceeds to step 424 and checks to determine if it has received the ball. When the synchronization process is run by nodes other than the first node, they go from step 412 directly to step 424.

At step 424, if the node has not received the ball, it will return to step 420 and continue this cycle until it is either time to exercise the link or the ball has been received. If the ball is received then the node goes from step 424 to step 426. At step 426 the node includes its local record with the ball and sends the ball on to the next device. (The last listed node will send the ball to the first listed node.) The node proceeds to step 418 and checks whether it has received the ball twice. If not, then the node proceeds to step 420 again and continues in that loop. When the ball is received the second time, the node goes from step 424 to 426 to 418 and then to step 428 and schedules a link exercise message to another node in order to test the communications link to ensure that it is working. This is the same step the node jumps to if the time to exercise the link counter in step 420 expires.

After the node has exercised its communications link in step 428, the node goes to step 430 and checks the integrity check counter to determine if it is time to enter the integrity check state as illustrated by the flow chart in FIG. 5. If it is not yet time for the node to enter the integrity check state, then the node will proceed to step 432 where it performs a synchronization and error checking loop. The node then cycles back to step 430 and will continue this loop until it is time for an integrity check.

In a preferred embodiment of the invention, the synchronization process occurs once per predetermined interval. The length of the predetermined interval is based on the number of nodes in the system. This interval could be larger or smaller, or based on something other than the number of nodes in the system, without deviating from the present invention.

Thus, the synchronization process illustrated by the flow diagram in FIG. 4 periodically updates the information in each node's database. This process allows each node to contain up to date information on the status of all the other nodes.

Integrity Check State

FIG. 5 shows the flow chart which illustrates a process employed for the integrity check state. In this state, each node checks to ensure that the database records contained in its memory appear to be synchronized, that there are no error conditions, and that the nodes are in the correct states. In step 512 the node checks the database sequence numbers to ensure that they all match. In this way, the node can ensure that the records in the database from each node are all from the same synchronization process.

If the sequence numbers do not match, then the node goes to step 514 and a flag is set for the sequence numbers to be reset to re-synchronize them. This error flag will prevent any coordinated team activities from taking place until another synchronizing interval has taken place and the database sequence numbers match.

If the sequence numbers match, or after the flag has been set in step 514, the node then continues on to step 516. In this step, the node checks each of the database records to ensure that they were all time stamped within one second of each other. This requirement ensures that the records in the database accurately reflect a picture of the system at roughly one point in time. If the records are not time stamped within one second of each other, then the node goes to step 518 and sets a flag for a new time stamp. This flag will not allow synchronized team activities if the time stamps are out of synchronization with each other by more than a predetermined amount set by the user. In one embodiment, if the time stamps are 5 seconds out of synchronization then an error flag is set. It will be appreciated that the allowable discrepancy of the time stamps is an implementation dependent parameter.

In the preferred embodiment of the invention, this strict implementation of the integrity check could be considered a "safe mode." It will be appreciated that consistent with the present invention other modes may exist that would allow the continued operation of team activities even with various levels of integrity check failures.

If the time stamps are not flagged as being out of synchronization, or after the flag has been set in step 518, the node then proceeds to step 520. In this step, the node checks for stop transfer errors, and if any exist, it tries to determine if the error can be cleared. Examples of errors are: (1) an out of synchronization error in which the database sequence numbers for the nodes do not match, and (2) a reconfiguration process occurred and was unable to be fully completed due to external conditions such as a malfunctioning switch.

If the error can be cleared then a flag is set in step 522 for the error to be cleared. The node then continues on to step 524. In this step, the node determines if it is all ready for transfers. After a reconfiguration event, the node must make sure that all of the nodes are synchronized and that other necessary conditions are met. For example, in one embodiment, the node checks its database to determine if all of the nodes have an average 3 phase load that is within a predetermined user defined limit. If the node determines that it is all ready for transfer, then it will go to step 526 and set a flag indicating that it is all ready for transfer.

Next, the node goes to step 528 to determine if it is in the correct ready state. Each node can be either ready for a transfer process or ready for a return to normal process, and all nodes should be in the same ready state. In this step, the node will compare which ready state it thinks it should be in based on its local information and the state that other nodes are in based upon information in the database. If the node is not in the correct ready state then it goes to step 530 and determines the correct ready state and changes to it.

The node then proceeds to step 532 where it checks to determine if there is a return to normal mode mismatch. In this step the node checks to make sure that all of the nodes are set to the same return to normal mode: open transition, closed transition, or function disabled. If all the nodes are not set to the same return to normal mode, then, there is a mismatch and at step 534 an error flag is set. Next, the node returns to step 310 in FIG. 3.

Transfer Process State

The transfer process state flow diagram of FIG. 6 will be described with the aid of a simple example. Referring to FIG. 1, assume a fault develops in distribution line 106 between nodes 108A and 108B. As described above, typical electrical distribution systems will have either a breaker or a recloser (reclosing breaker) at the source of supply for safety and for protection of the circuit. Utilizing the system disclosed in U.S. patent application Ser. No. 08/978,966, sectionalizers may be placed at switch locations 108A–F as shown in the FIG. 1. The "sectionalizer" described here is based on the EnergyLine Model 2801, with additional features added to support operation under a preferred embodiment of the invention. The standard sectionalizer logic will open (trip) the switch if: 1) its sectionalizing logic is enabled and the device is operational, 2) a pre-configured number of voltage losses (typically 1–3) on all sensed phases have been counted within a brief time period (typically 45 seconds), 3) an overcurrent condition was sensed just prior to the first voltage loss, and 4) the switch is presently closed. An additional option in the conventional software allows the switch to trip if voltage, sensed on all three phases, becomes grossly unbalanced, and remains unbalanced continuously for a configured time period (typically 30 seconds).

It will be appreciated that consistent with the present invention the "sectionalizer" described here may be one of many types, including but not limited to multi-switch operators, fault interrupting switches, and air-break switches, without deviating from the intent of the present invention. For the purpose of this example, the single switch sectionalizer described here will be used.

An optional feature that can be provided in a preferred embodiment of the invention causes the switch to open on a configured count of voltage losses even if a fault was not sensed just prior to the loss of voltage. This allows the first step of isolating both sides of the faulted section of line to be executed immediately without communication to other devices. Another optional feature causes the configured count on voltage losses (subsequent to sensed faults) to be dynamically calculated locally based upon the position of the switch relative to the presently designated open tie switch. Configuration parameters allow this dynamically calculated range of counts to be further constrained by the user to always fall between a minimum and maximum number. Another option allows the switch to open after a single extended voltage loss. Finally, the counting of faults followed by voltage losses can be configured to count each event as a fault either: 1) if the first voltage loss was preceded by a fault, or 2) if all voltage losses were preceded by faults.

Another unique feature of a preferred embodiment of the invention is its modified one-shot-to-lockout capability. If a switch is closed as part of any automatic operation (or manually closed by a human operator), some sectionalizers, including the EnergyLine Model 2801-SC, can be configured to automatically re-open the switch if a voltage loss is detected during a brief interval following the operation (typically 5 seconds). A preferred embodiment of the invention has the additional capability to avoid opening the switch until two counts of voltage loss have been detected. This becomes a benefit when the circuit's breaker reclose pattern includes an initial instantaneous close operation following a trip operation due to a fault.

Those skilled in the art will recognize that consistent with the use of automatic line sectionalizers at each switch location, reclosers could also be substituted such that the switch was opened/operated one or more times under load to clear the fault. Although this would require modifications to the prepackaged, commercially available recloser products to support the team coordination functions, comparable functionality to that provided by the sectionalizer could be achieved. It should also be noted that a variation of the one-shot-to-lockout capability implemented in the sectionalizer implementation is available in many reclosers as the "block reclose" option. The challenge with the approach of substituting reclosers for sectionalizers, as mentioned in the introduction, would be to coordinate the protective settings of these reclosers to prevent excessive switching or tripping/ lockout of the wrong device. It is an object of this invention to provide the means to minimize or eliminate this possibility. If the power distribution system of FIG. 1 contains an automatic sectionalizing device, then after the fault occurred between nodes 108A and 108B on distribution line 106, the device, depending on how it is configured, would cause switches in any one or all of nodes 108A, 108B and 108C to open causing all users 104A, 104B, and 104C that are down stream from an open switch to lose service.

In one implementation of the invention, the sectionalizing logic will be set up to open all switches between the fault and the normally open tie switch 108G. This allows the present embodiment of the invention to reclose switches one at a time to gradually increase the load seen by the distribution system to aid the system in resuming service to users. Once any node has finished sectionalization the node enters the transfer process state illustrated in flow diagram of FIG. 6 in which a node will attempt to close its switch. Also a node will enter the transfer process when it receives a communication that another node or team of nodes has entered the transfer process.

Without departing from the present invention, the transfer process state could be initiated by an event other than finishing sectionalization. Depending on the type of distribution system and its needs and characteristics, it may be desirable to have other events trigger the system into action. For example, it may be desirable to have the system triggered into action by detection of a serious under or over voltage condition.

Each node is continually updating the record in its database concerning its own status information. Thus, while the records in the database concerning all other nodes, the ball, is sent to each node only in the synchronization process state, each node maintains an updated record on its own status.

For the purposes of this example, assume that sectionalization has caused the switches in nodes 108A, 108B, and 108C to open resulting in users 104A, 104B, and 104C all losing service. Once sectionalization has ended, each of the three nodes 108A, 108B, and 108C will independently begin the transfer process state, because they each have undergone standalone sectionalization.

When a node enters the transfer process state depicted in the flow chart of FIG. 6, the node executes step 612 and starts the end process timer task. This timer ensures that the nodes do not spend too long trying to complete the task. Should something prevent the node from completing the task in the allotted time, the timer will end the transfer process state. Each node will use the same start time for its timer as the node that first initiated the transfer process. In this way, all nodes in the transfer process will "time out" at the same time. The operation of this timer and the task it calls are shown in FIG. 8 and will be discussed below.

The length of the timer can be set by the system operator to meet the needs of the particular system being controlled. For example, to ensure the safety of repairmen working on the power lines after a fault has occurred, the timer could be set to remove the nodes from the transfer process a known period of time after the fault occurred. In this way, even if the conditions in the transfer process state are met which would have allowed a switch to close and energize a power line, repairmen who have begun to service the system are not put in danger because the transfer process has timed out and the switch will not close.

In a preferred embodiment of the present invention, each of these three nodes enters the transfer process on its own, triggered by its own logic, stored data and sensor readings. The presently preferred embodiment of the invention does not require central control, communication, or approval for any of the nodes to enter this state.

Once the timer has been started, the node proceeds to step 616 and determines if the switch it is controlling is closed during the normal operation of the distribution network. Referring to FIG. 1, switches 108A, 108B, 108C, 108D, 108E, and 108F are closed during normal operation of distribution system, and switch 108G, a tie switch, is open during the normal operation of the system. Since switches 108A, 108B, and 108C are each normally closed during the operation of the system, these nodes will continue on to step 618. At step 618 each of the nodes that has entered the transfer process state will transmit its updated record to the next active node listed in the database and the previous active node listed in the database. These two nodes are called the "nearest neighbor" nodes. Node 108A will transmit to node 108B, node 108B will transmit to nodes 108A and 108C, and node 108C will transmit to nodes 108B and 108G. In this way each switch that has entered the transfer process state will inform its nearest neighbors of its progress. It will be appreciated that, although the presently preferred embodiment employs communication between "nearest" neighbors, alternative embodiments may employ different node-to-node communication patterns consistent with the invention. Thus, in accordance with a presently preferred embodiment of the invention, each node can inform other nodes of its state regardless of the physical layout of the distribution system or the physical deployment of the nodes.

It will be appreciated that if the node is a multi-switch node, for the purpose of the transfer process only, a "nearest neighbor" may be one of the switch positions within the node itself. In the preferred embodiment of the invention a nearest neighbor database is assembled from the information contained in the internal team database. The transfer logic is then executed using the information in the nearest neighbor database. If the node is a multi-switch node, separate nearest neighbor databases will be constructed for each switch position. In the present example, the nearest neighbor database consists of information from the local node and the two nodes that are physically adjacent to it.

When node 108G receives the communication from node 108C, node 108G will start the transfer process state. In general, when one node receives a communication from another node that the other node has entered the transfer process state, the node receiving the communication will itself enter the transfer process state. This procedure allows the system to self organize, eventually putting each node of the system into the transfer process state without requiring any communication from a central office or any interaction with a human.

Furthermore, in the presently preferred embodiment, there need not be any centralized control or logic center to decide what actions are appropriate for each node to undertake at a given point in the process. Each node of the present invention can operate based only on its sensors and the information in the database. Due to this simple operating structure, the present invention can be easily expanded or reconfigured by simply reordering the nodes in the database without the need to change the programming or logic of the present invention. For example, to add a new node between nodes 108B and 108C of FIG. 1, the system operator would physically insert the new node into the system at the appropriate place and program it into the database between nodes 108B and 108C. This is accomplished by moving the records for all of the nodes in the database after node 108B down one space and inserting the record for the new node in this newly created space in the database.

Node 108G executes step 612, starts the end transfer process timer, sets it to end at the same time as the node(s) that initiated the transfer process, and then goes to step 616. Since node 108G controls a switch that is normally open it will go to step 638. At step 638 node 108G will observe its sensors, the information in its database, and the information sent to it by node 108C to determine whether it can close. In a presently preferred embodiment of the invention, the conditions listed in Table 1 are checked by the node in order to determine if it can close. The conditions used at step 4 in Table 1 are shown in Table 2. Other sets of conditions could be used without departing from the invention.

Table 1

In order to close the normally open switch associated with a node, one valid closed switch and one valid open switch must be detected as the adjacent switches associated with adjacent nodes on either side of the normally open switch. The following rules define the conditions that must be met for the normally open switch to validate the state of adjacent switches.

A normally open switch on the load side of a faulted line section may close for the purpose of restoring load if:
1. no error conditions exist
2. the adjacent fault side switch is open
3. the adjacent fault side switch did not detect a fault, but did see a loss of voltage
4. the current level seen by the adjacent fault side switch before the outage is within the bounds set in the local switch (The conditions used in this step are shown in Table 2.)
5. the adjacent non-faulted side switch indicates it observed a voltage loss and/or fault but it is now closed, or the adjacent non-faulted side switch is the normally open switch, or the adjacent non-faulted side switch is a breaker and voltage has been restored (this step is bypassed if the local switch is the normally open switch, no team reclosers exist on the alternate feeder, and voltage checking is disabled)
6. the "number of segments" that can be picked up is greater than zero. For this test, the number from the local record of the team database corresponding to the non-faulted direction of supply (left or right) is used.
7. good voltage is detected on its voltage sensors (this test is a user-configurable option).
8. the adjacent switches are in the proper logical operation step Table 2

(This Table elaborates on step 4 in tables 1 and 3)

In order to determine whether load may be restored during a transfer process, the process uses the total load to be transferred compared to the capacity of the alternate circuit. Three basic set points are used by an engineer to limit transferred load. They are:

Capacity for Transfer (total feeder load N/A)

Maximum Capacity for Transfer

Maximum Rated Feeder Capacity

All three set points have settings for the left feeder and the right. All three also have summer and non-summer season settings.

The transfer process utilizes, if available, the real time total load on the associated feeders. This real time total load value may come over communications from any source such as a substation RTU.

The two set points that work with this process are the "Maximum Capacity for Transfer" and the "Maximum Rated Feeder Capacity". The "Maximum Capacity for Transfer" is the configured amount of load that may be transferred to an alternate feeder when that feeder is lightly loaded. The "Maximum Rated Feeder Capacity" is used in combination with the actual real time load. The difference between these two is the present real time capacity the alternate feeder can handle. In order for a transfer to occur, the load that was reported to exist before the reconfiguration event began by the next open switch must be less than both the present real time capacity and the "Maximum Capacity for Transfer".

The real time load must be sent to the switch controls at least once every 20 minutes. After 20 minutes past the last reception of real time load the value goes to undefined. An undefined value causes the fall back process to take affect. This prevents old load data from allowing transfers to occur when the source of this data fails to report it.

The fall back process uses the "Capacity for Transfer (total feeder load N/A)." This value is intended to be a conservative value. When configuring this value the engineer should take into account average loading, peak loading, and the emergency load capacity on the alternate feeder. The engineer should feel comfortable that a transfer of this amount of load can occur at any time and still be accommodated by the alternate feeder.

Note that the process for the two feeders is independent. Real time loading data may be provided for one feeder while the other feeder uses the conservative transfer process.

Assume that all of the conditions are met to allow the switch at node 108G to be able to close. Through the use of the conditions listed in Tables 1 and 2, the node can determine on its own whether or not it can close its associated switch. Additionally, only one message had to be sent to enable node 108G to act to restore service—the message from 108C. In the preferred embodiment of the present invention, and in the case where the team includes protective devices such as breakers or reclosers, the normally-open switch is thus closed with the additional assurance that the protective settings of all of the source-side team members have been preselected to handle the additional load. If the conditions were not met to allow the switch to be able to close, then node 108G would go to step 640 and execute the synchronization and error check routine. If an error is detected during this time then at step 642 it is recorded and the transfer is stopped. Otherwise, at step 652 a check is made to see if this is the first iteration of the loop. If it is the first iteration the local record is transmitted to the nearest neighbors at step 653. If it is not the first iteration then the process continues at step 638 to determine whether the normally open switch can be closed.

If the normally open switch is unable to close at step 640 (as above) and transmits its local record to its nearest neighbors, node 108D will receive the notification and enter the transfer process state at step 610. Node 1 08D will continue through the transfer process (steps 612, 616, 618 as stated elsewhere) and since it is on the unaffected portion of the circuit it will pass through step 644 and into step 645.

In the preferred embodiment, steps 645–651 provide an improvement in accordance with the present invention in that these steps are present to notify and enable nodes that were otherwise unaffected by the transfer event to adjust their protection settings to pick up additional load during the transfer process. It would not deviate from the scope of this invention for the adjustments to include other settings or operations related to switched capacitor banks, voltage regulators or other devices.

If node 108D is the last member of the team (only one neighbor exists), it will calculate the segment count allowed in step 647 and transmit its local record, including new segment count, to its neighbor in step 649. Then, node 108D will enter step 632 where it will wait for the transfer process to end, along with checking for errors in step 634.

If node 108D is not the last member of the team (it has two neighbors), it will enter step 646 to transmit its local record to its nearest neighbors. Before it can continue through the transfer process, it must receive a notification back from node 108E with 108E indicating it has progressed into step 632 (node 108E has entered the transfer process and followed the same process as node 108D). Until that indication is received, node 108D will cycle through the error detection step 650. Once the data is received, node 10BD can continue to step 647 to calculate a new segment number, step 649 to transmit its local record to its neighbors, and to the step 632 and step 634, looping until the transfer process is complete.

Node 108G will receive the updated local record from node 108D when node 108D has passed through step 649 and into step 632. Node 108G can now use this updated record to determine if it can close in step 638. If node 108G is still not allowed to close it will continue with the error detection loop which includes step 640. If node 10BG is allowed to close, it will continue to step 626 to close its switch.

Otherwise, the node will continue to cycle between steps 638, 640 and 650 until the switch can be closed, an error is detected, or the end transfer process timer expires. It should be noted that in the case of teams containing only sectionalizing switches without protective capabilities, the number of segments criteria will always be satisfied without additional communication, and the only typical condition that would delay closing of the switch would be a wait for the other affected nodes to reach the correct transfer process state. This distinction allows the support for profile modification in protective devices to be added to prior reconfiguration products in a compatible manner.

Once node 108G determines that it can close, its associated switch it will proceed to step 626 and attempt to close it. Typically, such switches will have safety devices called lockout logic, as detailed above during the discussion of sectionalization, that will force the switch back open and keep it open if an anomaly such as a voltage loss is detected when the switch is closed. At step 628, the switch determines if the closing operation was successful. If it was not then at step 624 an error flag is set and the transfer process is stopped. If the close operation was successful, then power is restored to users 104C and node 108G continues to step 630. At step 630, node 108G sends its updated record to its nearest neighbors, nodes 108C and 108D. Node 108D now enters the transfer process state, and as nodes 108A, 108B, and 108C did, node 108D will proceed down the flow chart to step 618 and send its updated record to nodes 108G and 108E. This will cause node 108E to enter the transfer process state and signal nodes 108D and 108F causing 10SF to enter the transfer process state and signal node 108E with its updated recorded.

As can be seen from the present example, one feature of the invention is that from only the ordering of the nodes in the database and the rules of the flow charts, each node can determine the appropriate actions to take independently of actions taken by other nodes. Nodes do not command other nodes to take any given action, nor is central control or human intervention necessary to coordinate the response of the entire system. The decisions made by each node are based solely on information it has stored in its database and sensors attached to it.

Nodes 108A, 108B, 108C, 108D, 108E, and 108F all will proceed to step 644. Since the switches at nodes 108D, 108E, 108F are normally closed switches and they were not affected by the fault, they will be sent to step 632 at step 644 and will wait for the process to time out while they perform the synchronization and error checking loop with steps 634 and 636.

Since the switches at nodes 108A, 108B, and 108C were affected by the event, they each proceed to step 620. In a presently preferred embodiment of the invention, the conditions listed in Table 3 are checked by the node in order to determine if it can reclose. The conditions used at step 4 in Table 3 are shown in Table 2. Other sets of conditions could be used without departing from the invention.

If these switches cannot be reclosed, then, the nodes will go to step 622 and perform synchronization and error checking. In the preferred embodiment if an error is detected, then in step 624 a flag will be set, and the transfer process state will be stopped. It will be appreciated that in other implementations of the invention error flags may cause different results. In one example, error flags may be prioritized so that lower priority errors may not stop the transfer process.

If no error was detected at step 622, at step 654 the number of segments that can be picked up is recalculated using the rules for calculating the number of segments field during transfer events. If the result of this recalculation may allow the normally closed switch to reclose, at step 620 the logic will exit from the loop and reclose the switch at step 626. Otherwise, each node will cycle through steps 620, 622 and 654 until the switch can be reclosed or the process timer expires.

Table 3

In order to reclose the normally closed switch associated with a node, one valid closed switch and one valid open switch must be detected as the adjacent switches associated with adjacent nodes on either side of the normally closed switch. The following rules define the conditions that must be met for the normally closed switch to validate the state of adjacent switches.

A presently open switch on the load side of a faulted line section may close for the purpose of restoring load if:

1. no error conditions exist
2. the adjacent fault side switch is open
3. the adjacent fault side switch did not detect a fault, but did see a loss of voltage
4. the current level seen by the adjacent fault side switch before the outage is within the bounds set in the local switch (The conditions used in this step are shown in Table 2.)
5. the adjacent non-faulted side switch indicates it observed a voltage loss and/or fault but it is now closed, or the adjacent non-faulted side switch is the normally open switch, or the adjacent non-faulted side switch is a breaker and voltage has been restored
6. the "number of segments" that can be picked up is greater than zero. For this test, the number from the local record of the team database corresponding to the non-faulted direction of supply (left or right) is used.
7. the adjacent switches are in the proper logical operation step A normally closed switch on the source side of a faulted line section may reclose if:
a. no error conditions exist
b. the adjacent fault side switch is open
c. the adjacent fault side switch detected a fault
d. the adjacent non-faulted side switch indicates it saw a voltage loss and/or fault but it is now closed, or the non-faulted side is the breaker and voltage has been restored
e. the adjacent switches are in the proper logical operation step Through the use of algorithm of Tables 2 and 3, a node can determine on its own whether or not it can close its associated switch. Assume that all of the conditions are met to allow the switch at node 108C to be able to reclose its switch. The switch will then be reclosed at step 626.

At step 628, node 108C will determine if the switch was successfully reclosed. If it was not, then an error flag is set and the transfer process is stopped in step 624. If the switch was successfully reclosed, then the node proceeds to step 630 and informs its nearest neighbors, nodes 108B and 108G, of its progress by sending them an updated version of its record. Node 108C then enters the loop between steps 632 and 634 where it performs the synchronization and error checking routine while it waits for the end transfer process timer to time out. If an error is detected, step 636 is executed and a flag is set and the transfer process is stopped. An example of an error is if the lockout logic causes a switch to reopen.

As the above discussion and rules indicate, one benefit of a preferred embodiment of the present invention is its ability to operate by systematically closing only one switch at a time so that the load to the system is brought on line gradually, one segment at a time. This helps ensure that the power source will not be overloaded due to too rapid an increase in demand.

When node 108B receives the communication from node 108C, assume that node 108B will have enough information to know that according to the conditions listed in Table 3, it should not close since node 108A detected a fault and node 108B did not. This must mean that the fault was between nodes 108A and 108B. Therefore, node 108B will cycle between states 620 and 622 until an error is detected or the end transfer process timer expires. Node 108A, since it has detected a fault, will also not be allowed to close and will cycle though steps 620 and 622 until an error is detected or the process timer times out.

When the end transfer process task timer times out, the nodes will all return to step 310 of FIG. 3 and resume synchronization, error and integrity checks until the original fault is repaired. If the fault is repaired, the system will enter the return to normal process state of FIG. 7 discussed below. If another fault occurs before the previous one has been corrected, it would not deviate from the present invention for the system to re-enter the transfer process state and again reclose switches to return service to as many users as possible.

Return to Normal Process State

After a fault has occurred or if for any other reason the distribution network switches have been put in states other than their normal operating states, for example after the transfer process has completed, the return to normal process state can return the system to its normal operating configuration. This process can also be used to reconfigure the distribution system to any desired system set up of open and closed switches without deviating from the present invention. In the example used above, once the fault in distribution line 106 has been repaired or cleared and switch 108A has been manually reclosed, power will be restored to users 104A. At this point, node 108B will sense that normal voltage has been restored to the distribution line between nodes 108A and 108B and it will be triggered to enter the return to normal process state after node 108B has detected stable 3 phase voltage on the channel for a predetermined time and no errors exist and the normally open switch has not detected a fault. Once any switch in the system has entered the return to normal state, it will signal all other switches to enter the return to normal state.

In the preferred embodiment of the invention, a node without voltage sensors on the normal source side of the switch may use information from the nearest source side neighbor to determine if voltage has been restored. To do this, the node assumes that voltage has been restored if the nearest source side neighbor node has a closed switch and is detecting good voltage. The local node must see this condition continue for a predetermined time to validate that voltage has returned.

In another embodiment of the invention the, return to normal process can be triggered on demand by an external device or human. It will be appreciated that this on demand activation of return to normal can be used for, but not limited to, starting the return to normal process before the predetermined time has elapsed, or as a one step method of return to normal without manually closing any team switches.

The return to normal process can occur in one of two methods, an open transition or a closed transition. As is well known by those skilled in the art, an open transition is one in which the source of supply of power to users is interrupted in the process of switching between alternate sources of supply. For instance, in this example, if tie switch 108G was opened up before switch 108B was closed then users 104B and 104C would momentarily lose power. This would be an open transition. In a closed transition, switch 108B is closed before switch 108G is opened and users 104B and 104C do not lose power. The system operator can configure the system to operate in either an open or closed transition mode.

During a closed transition, the normally open device must reopen following the allowed transfer time whether it has heard from the normally closed but presently open device or not. This is done to prevent the parallel of lines for an extended period of time. Also, if the node with the normally open switch detects that a parallel condition exists before the return to normal process has begun, the node will begin the return to normal process and open its switch to break the parallel.

It is well known by those skilled in the art that the reliability of the closed transition return-to-normal sequence is greatly facilitated if the automated logic can adjust the settings of the protective devices on the circuit just before and just after executing the closed transition. These adjustments include but are not limited to blocking and unblocking the ground fault detection on nodes that act as protective devices. Thus, it is an object of the present invention to provide the means to coordinate these adjustments with the closed, return-to-normal transition, as outlined below.

At step 712, the node starts the end transfer process task timer. Each node will use the same start time for its end transfer process timer. This timer ensures that the system does not spend too much time attempting to execute the return to normal process. The timer is set to run for a predetermined time set by the system operator. In one embodiment, this timer is set to run for one minute. The node next executes step 716. Since nodes 108A–F are normally closed switches, each of these nodes continues on to step 718.

Switches 108D–F are normally closed switches that were not open so they will each go to step 750, where if the transition method is closed the nodes will continue to step 751 to perform actions that will prepare them for the closed transition. The nodes then continue to step 730 and perform a synchronization and error checking loop while they wait for the process to end. If the transition method is open, the node will simply progress from step 750 to step 730 to perform the synchronization and error-checking loop.

Switches 108A and 108C are normally closed switches that were reclosed by the transfer process so each of these nodes will also go to step 750, where if the transition method is closed the nodes will continue to step 751 to perform actions that will prepare them for the closed transition (as stated previously). The nodes then continues to step 730 and performs a synchronization and error checking loop while they wait for the process to end. If the transition method is open the nodes will simply progress from step 750 to step 730 to perform the synchronization and error checking loop.

Node 108B is a normally closed switch that is open so it moves on to step 720 to determine if it is an open transition.

Assume the system operator set the system to undergo a closed transition. Then, node 108B goes from step 720 to step 752 to perform actions that will prepare it for the closed transition (as stated previously), then to step 722. If the normally open switch, 108G, is armed to reopen (see below), the switch on the supply side of switch 108B, switch 108A, is closed, and communication of the initial start return to normal process message was successful to all members of the team, then node 108B will continue on to step 724 and close its switch. The requirement of the reply to the initial start return to normal process message insures that all nodes within the team have prepared themselves for the closed transition state. The normally open switch is armed to reopen when it has entered the return to normal process, the method used will be a closed transition, and it has informed all other nodes in the team of its state, as will be seen in greater detail below.

If the normally open switch is not armed, or the supply side switch is not closed, or the initial start return to normal process message has not yet been successfully sent to all team members, then node 108B will perform a synchronization and error-checking loop and return to step 722. This loop will continue until either all conditions are met or the end transfer process timer expires.

If the switch is closed at step 724, then at step 726 the node checks to see if the switch is closed. The switch could have been reopened by lockout logic or any other safety feature on the switch that might force it back open. If the switch is closed then at step 728, the node will inform its nearest neighbors and the normally open switch, 108G, by sending them an updated version of its record. The node then goes to step 730 where it performs the synchronization and error checking loop while waiting for the end transfer process timer to time out. If the switch is not closed at step 726, then at step 732 an error flag is set and at step 734 the node informs all other nodes that an error has occurred and the node then goes on to step 730.

If the system is set to undergo an open transition, then at step 720, the node will go to step 746. If the normally open switch is open and the supply side switch, switch 108A, is closed then the node will continue on to step 724. If either of these conditions is not met, then the node will perform a synchronization and error-checking loop between steps 744 and 746.

Switch 108G is a normally open switch so at step 716 it will proceed to step 736. If the system is undergoing a closed transition, the node goes to step 753 to perform actions that will prepare it for the closed transition (as stated previously), then to step 754 where it will arm itself to open and send its local database record to all other team members, and then to step 738 where if all the other switches are closed, node 108G will open the normally open switch at step 740. The node will then check if the switch is actually open at step 742. If the switch is open it will send its updated record to all the nodes at step 734 and then enter the loop at step 730 and wait for the process timer to end. If the switch is not open at step 742 then an error flag will be recorded at step 732 and the node will proceed to step 734.

At step 738, if all the other switches were not closed, then the node will loop to step 744 and perform synchronization and error checking and look back to step 738. This loop continues until all the switches are closed, an error is recorded or the timer expires.

If the system were programmed to undergo an open transition, then at step 736 node 108G would not look to see if other switches were closed and it would skip to step 740, open the switch and continue the flow chart from that step.

End Process Timer Task

Whenever a node enters either the transfer process or the return to normal process, the node starts the end process timer task. The flow diagram for this task is show in FIG. 8. At step 812 the node loops until the timer expires. The timer is initiated when the node enters the task and from the information sent to the node by other nodes, each node will know the time at which the first node to enter the task in question began the task. In this way, all of the nodes can set their end process timers to expire at the same time. It would not deviate from the invention to have the end process task timer be of different durations for the transfer process and the return to normal process.

Once the timer expires, the node will stop the process it is in at step 814. At step 830, if the process that was stopped was a closed transition return to normal event, the node will continue to step 831 to return settings that were changed to prepare for the closed transition (for example unblocking the ground relay if applicable). It should be appreciated by those skilled in the art that the reset of the closed transition settings could also be accomplished after step 734 or at any time when the normally open switch has been verified to be successfully reopened. From both step 830 and 831, the node will continue to step 816 and look to see if the switch is in the proper position for the end of the process that was stopped. For example, is the switch in its normal position at the end of the return to normal state. If the switch is not in the correct position, then step 818 is executed and an error flag is set and the node returns to the synchronization process at step 820.

If the node's switch is in the correct position then at step 816, the node goes to step 822 and checks to see if the circuit is in the normal configuration. If it is, then the node goes to step 820. If it is not in the normal configuration, then the node goes to step 824 and checks if the return to normal is enabled. If the system does not have the return to normal enabled it will go to step 826 and change its operation state to no operation and wait for further instructions before it can re-enter the ready to transfer state. From step 826, the system will go to 820.

If the return to normal is enabled then at step 828, the node changes its operation state to ready for return to normal and then proceeds on to step 820.

Sideline Team Nodes

As will become apparent to those skilled in the art, the use of the sideline team node in accordance with the present invention expands the capability of the method and apparatus to operation of more complex circuit topologies and more diverse sources of data.

The sideline team node may be distinguished from active team nodes mentioned previously in two ways; 1) the sideline team node is not active within the synchronization and integrity check process, 2) the sideline team node does not itself directly execute a process associated with the reconfiguration process described previously. Instead, the sideline team node is used by an active team node to acquire additional data about the environment around the team. This data can then be used to alter the process within the team. This will become clear with the use of two examples below.

It will be recognized by those skilled in the art that the method for acquiring the additional data will usually involve data communications. This may be achieved using various communications technologies for point-to-point communications or may be achieved by sharing the same communication infrastructure used by the team communication channel, 110. In addition, in the case of dual or multiple switch nodes, the communication step may be bypassed entirely.

In the preferred embodiment of the present invention, each active team node may be responsible for one sideline team node. The addressing of sideline team nodes is contained within a table similar to the database of node records. The address data for the sideline team node is contained in the record with the same device number as the record in the database of node records for the active team node that is responsible for the sideline node. Other means for storing sideline team node addressing is also possible without deviating from the intent of the present invention. For example, it would also be consistent with the present invention for the table storing sideline node information to include identifiers that would specifically associate a sideline team node with an active team node, thereby allowing the number of sideline team members per active team node to be greater than one.

Figure 9:
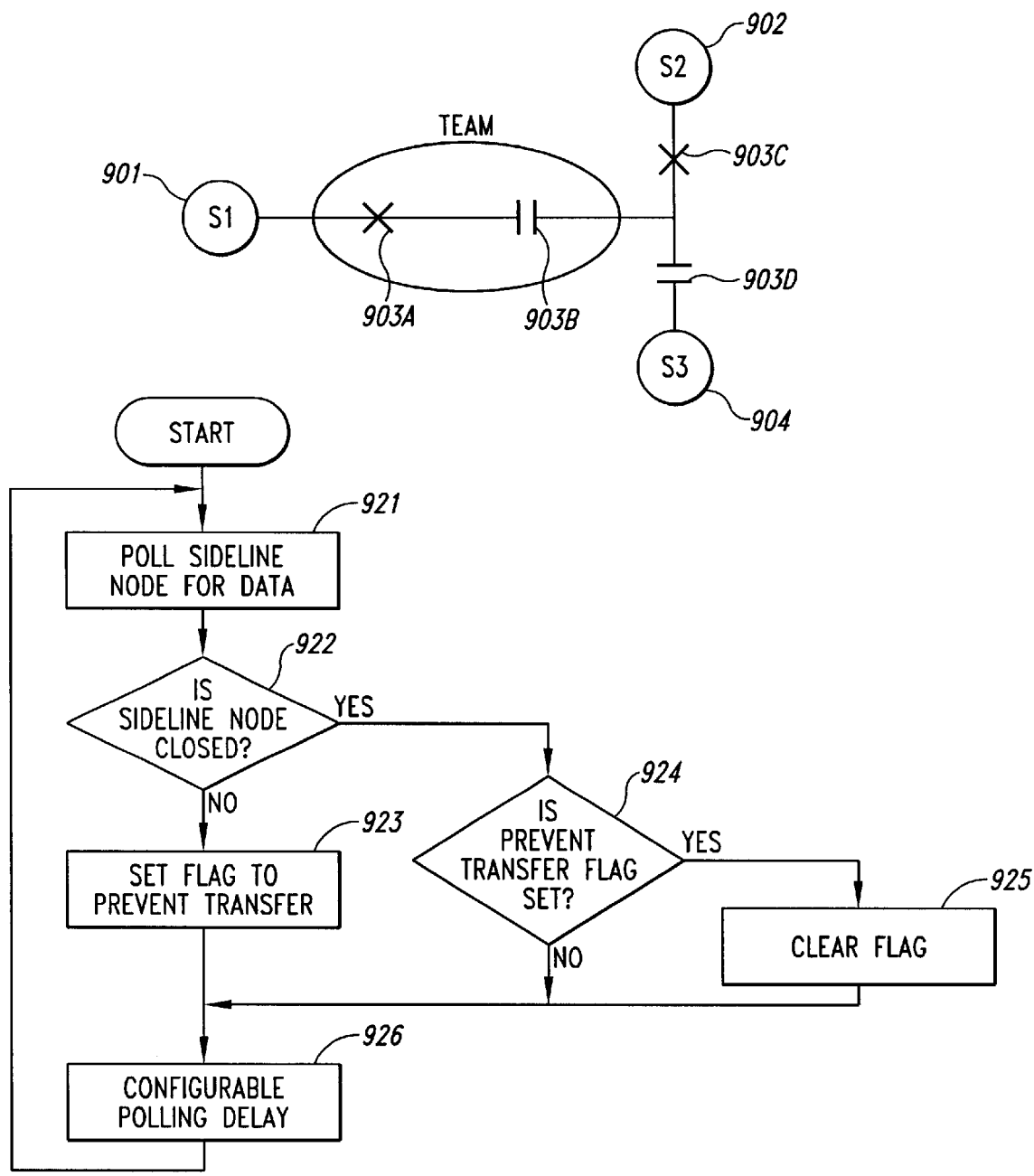
FIG. 9 shows an alternate configuration of a distribution system which places additional restrictions on the ability of the alternate source to supply power, and flow chart for supporting the configuration.
Figure 10:
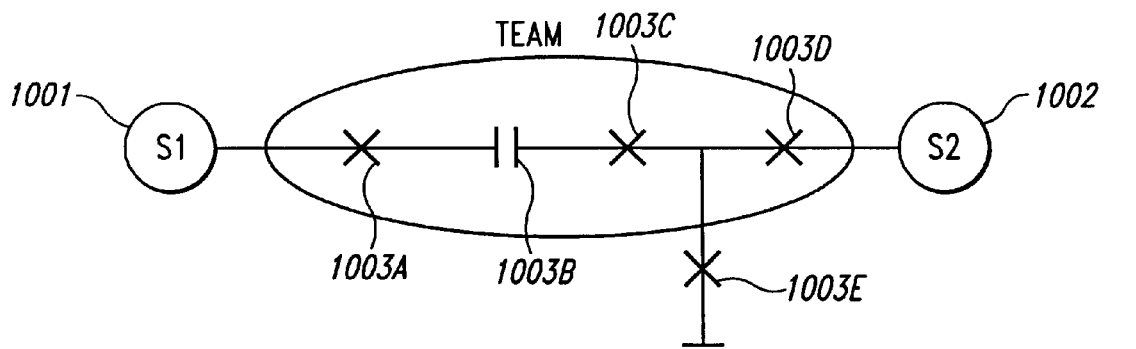
FIG. 10 shows an alternate configuration of a distribution system with improved fault isolation capabilities, and flow chart for supporting the configuration.
Figure 10:
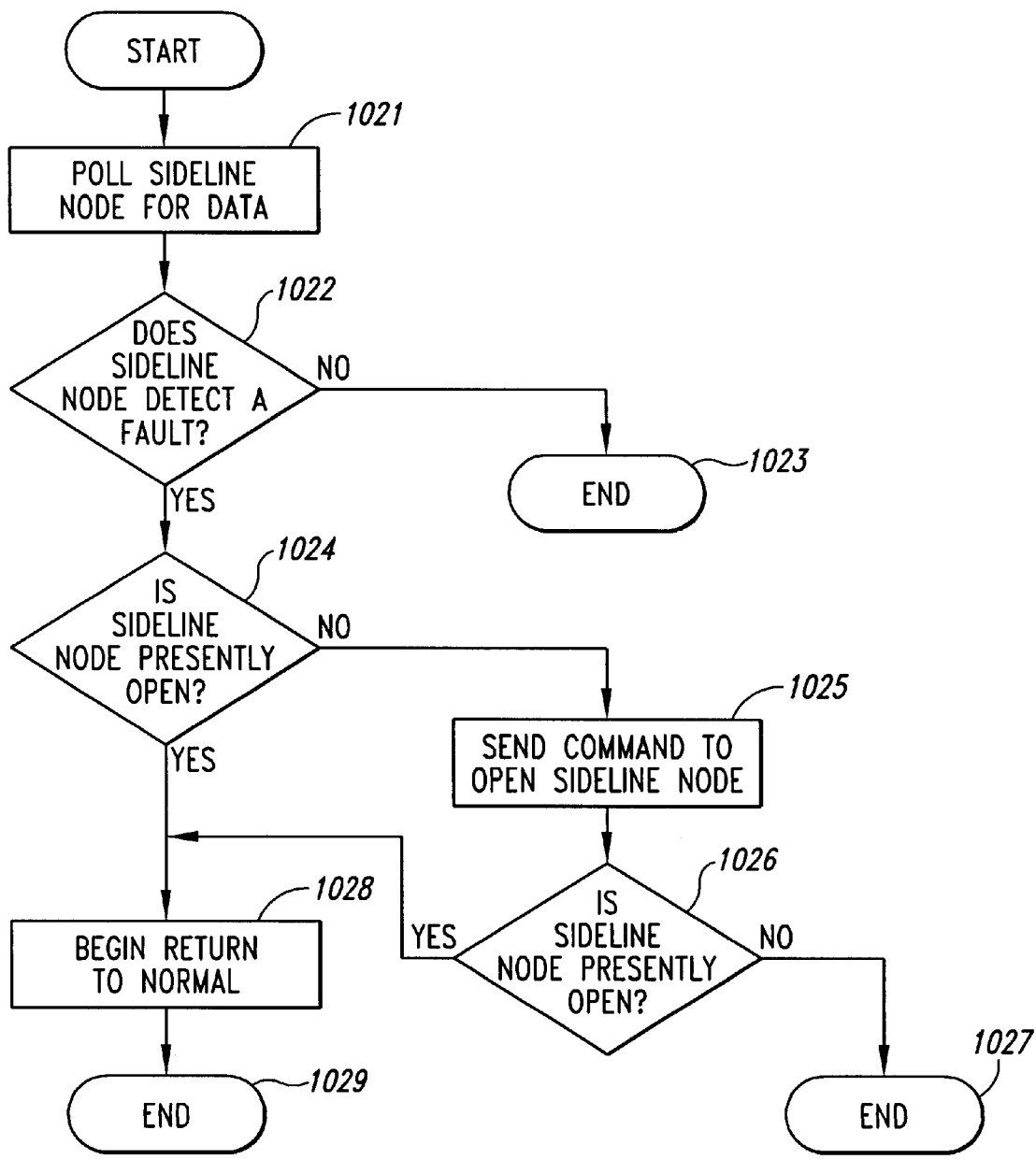

With reference now to FIGS. 9 and 10, the following are two examples of uses of the sideline team node. Those skilled in the art will recognize that S1–3, (901, 902, 904, 1001, 1002) are all sources of supply for the circuits. Nodes 903A, 903C, 1003A, 1003C, 1003D and 1003E are all normally closed switches. Nodes 903B, 903D and 1008B are all normally open switches. It will be obvious to those skilled in the art that these simple examples were chosen for the purpose of illustrating the possible uses of sideline team nodes, and that much more complex applications are possible. For example, it would be consistent with the present invention to utilize sideline team node communications to allow multiple teams to interact in order to reconfigure circuits with more than two possible sources.

The data available from the sideline team members could also be more complex. This data could include protection data such as present load readings, maximum available load current, etc. to prevent an impermissible amount of load to be picked up, power quality data such as voltage or harmonic content that could also be used to block transfer if it would negatively impact customers on the alternate source, or other device-specific data such as abnormal conditions in the sideline node controller.

The first example refers to sideline node 903C and team nodes 903A and 903B in FIG. 9. Team node 903B is responsible for collecting data from sideline node 903C, and using that data to make decisions about the operation of the team. In this example, the circuit containing team nodes 903A and 903B is normally fed from source 901, and uses the mid-point of circuit fed from source 902 as its alternate source such that if 903A were to be opened by a reconfiguration event, and 903B closed, the load served between nodes 903A and 903B would be fed from the alternate source 902.

It is important to note for the purpose of this example that source 904 is not capable of handling the additional load between 903A and 903B if node 903D were closed and 903C were open, and a reconfiguration event were to occur. For this reason the data that 903B retrieves from 903C is used to determine the alternate source that is presently available. If 903B finds that 903C is closed, source 902 must be the present alternate source, therefore, the load between 903A and 903B could be transferred to the alternate source if necessary. If 903B finds that 903C is open, source 904 would be the present alternate source, therefore a reconfiguration event can not be allowed.

This logic is illustrated in the flow diagram in FIG. 9. The steps in this flow diagram are executed in parallel to, but not connected with, the synchronization and integrity check process running in node 903B. It is assumed that upon start of the node's logic execution that a sideline node has been configured into the sideline table in node 903B. Node 903B begins polling the sideline node at step 921. With the data retrieved node 903B checks whether the sideline node is closed at step 922. If the sideline node is not closed, or the closed status of 903C cannot be positively verified for any reason, the logic proceeds to step 923 to set a flag to prevent automatic circuit reconfiguration from occurring. It will be appreciated by those skilled in the art that the polling loop, 921–926 could be replaced by a spontaneous report by exception scheme or other means to acquire the state of 903C, subject to the restriction that the data must be acquired and validated within a period of time comparable to the configurable polling delay referred to at 926.

If in step 922 it is found that the sideline node is closed, node 903B continues to step 924 where if the flag to prevent reconfigurations is set, it can be cleared in step 925, otherwise no further action is required. In all cases, node 903B will go to step 926 to wait a preconfigured amount of time before going back to step 921 to begin the polling cycle again.

It will be appreciated by those skilled in the art that if nodes 903C and 903D were themselves a switch team, node 903B could be used as a sideline node off of either node 903C or node 903D. In this way each of the two teams could prevent the other team from automatically reconfiguring its circuit if either team was already in a reconfigured state. It can also be appreciated that as teams grow in nodes, many more interconnection possibilities arise, each being consistent with the present invention.

The second example refers to FIG. 10 with nodes 1003A, 1003B, 1003C and 1003D comprising a switch team being fed from sources 1001 and 1002. Additionally, node 1003E is a sideline node (a simple, SCADA operable switch with fault detectors) installed on a tap line that feeds to a dead-end. Sideline node 1003E is contained in the sideline table of node 1003D such that node 1003D is responsible for retrieving data from node 1003E and using the data to enhance team operation.

In the present example, the settings of the breaker at source 1002 are configured such that the breaker will go to lockout on the third operation. It is also desirable to prevent any switches from opening on the first operation of the breaker to allow temporary faults to clear. This implies that nodes 1003C and 1003D must open their switches after the second operation in order for the fault to be cleared, a reconfiguration to begin, and as much of the load to be picked up as possible.

If a permanent fault were to occur on the line between 1003E and the end of the line, source breaker 1002 would operate twice, after which nodes 1003C and 1003D would open to begin the reconfiguration process. As described earlier, node 1003B would close into open node 1003C, the breaker would close into open node 1003D, leaving the fault apparently isolated between nodes 1003C and 1003D.

In this example, the execution of the logic associated with the sideline node is performed after the transfer event has completed. After the transfer event, node 1003D will poll sideline node 1003E for data. This data will include the indication of a fault past sideline node 1003E. Knowing the normal configuration of the circuit, and the more specific location of the fault, node 1003D can further isolate the fault by sending a command to sideline node 1003E to open its switch. Upon verification that the sideline node's switch is open, node 1003D can automatically begin the return to normal process, restoring load to the customers bordered by the three nodes 1003C, 1003D and the now open node 1003E.

This logic is illustrated in the flow diagram in FIG. 10. As stated previously, the logic is only executed following the end of a reconfiguration event, and before a return to normal event. After the reconfiguration event the node enters the logic and polls the sideline node at step 1021. If the data retrieved indicates that no fault was detected by the sideline node at step 1022, or any other abnormal condition is detected such that the location of the fault cannot be verified to be on the load side of 1003E, the node proceeds to 1023 to end the logic. If a fault was detected at step 1022, the node then determines if the sideline node is presently open in step 1024. If the sideline node is not presently open, the node continues to step 1025 to where it sends an open command to the sideline node. The node then again checks if the sideline node is open in step 1026 and if not can stop the logic at step 1027, or optionally retry the open command. If the sideline node is now open at step 1026, it will continue to step 1028 where it will signal the return to normal logic to begin. If the node were to find the sideline node 1003E initially open at step 1024, it would immediately continue to step 1028 to signal the return to normal logic. In both cases, this logic ends at step 1029 after the return to normal logic has been signaled.

It can be seen by those skilled in the art that numerous other possible circuit configurations are possible using this form of sideline node logic while remaining consistent with the present invention. Neither the number of nodes in a team nor the complexity of the circuit affect the use of this logic. For example, it will be appreciated that node 1003E can be associated with an automatic sectionalizer, contained in another team, or backed up by an alternate source without deviating from the present invention.

Protective Device Add-On Board

In the preferred embodiment of the present invention, the method disclosed above is incorporated into the operating instructions or stored program of the team node controller 200. Alternate embodiments in the form of microprocessor-based add-on boards support retrofit of products configured according to existing, prepackaged line recloser controls and substation breakers.

Figure 11:
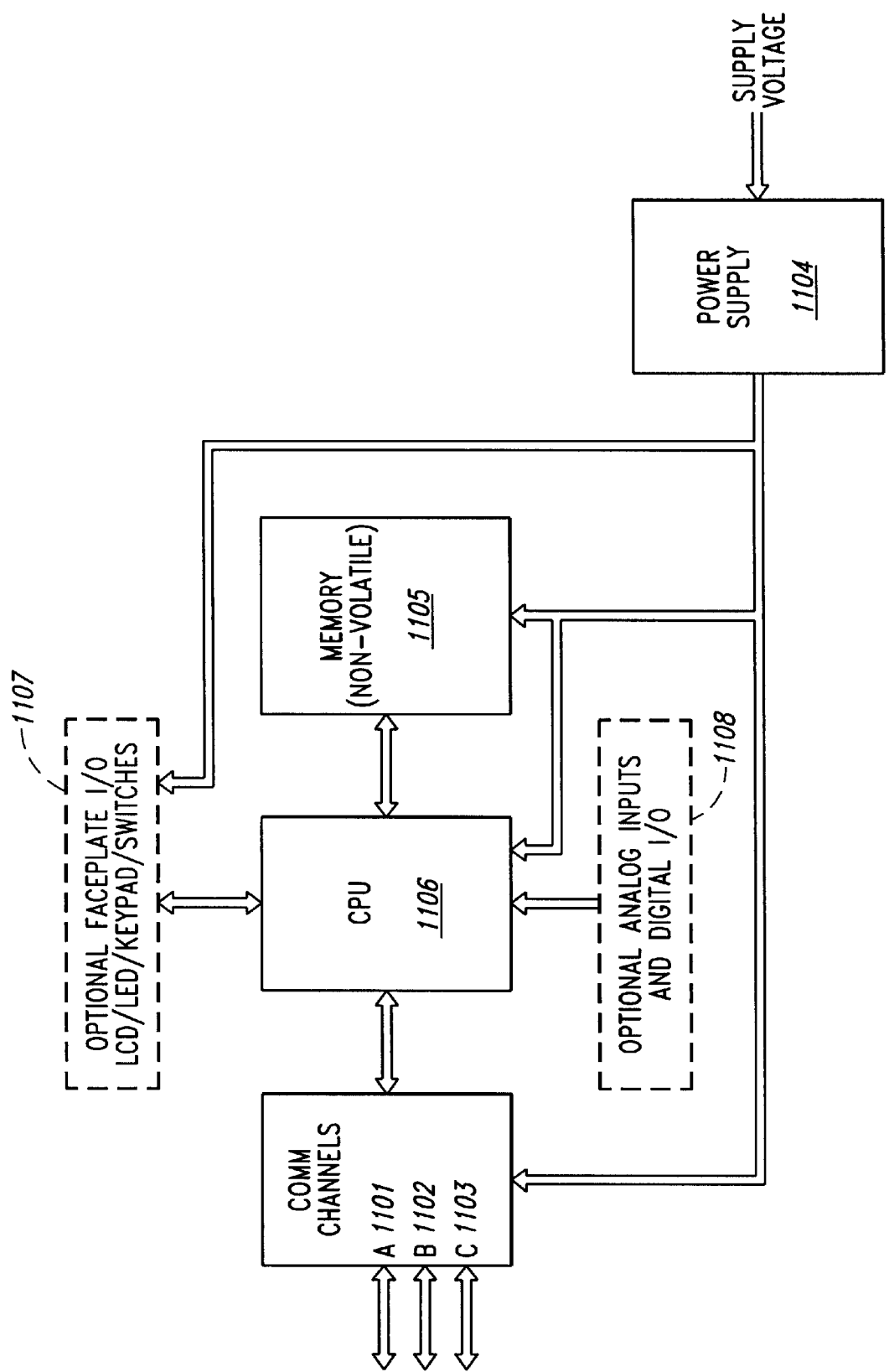
FIG. 11 shows a logical block diagram of an alternative embodiment of node controller 200, in which the circuit reconfiguration intelligence is contained in an add-on microprocessor board.

A block diagram of the recloser version of the add-on board is shown in FIG. 11. The board consists of a small electronic microprocessor-based circuit board, which can be provided for mounting inside an existing recloser control cabinet, or in a nearby auxiliary cabinet. The power for the board is supplied by the recloser's power supply/battery backup system 1104. The team reconfiguration logic is entirely contained in the memory 1105 and CPU 1106 of the add-on board, while the circuit protection logic and active switching functions remain in the recloser control. Thus, the addition of the team reconfiguration logic disclosed herein can be performed without modification to the logic or functionality of the recloser. The interface between the add-on board and the recloser is based entirely on digital communications. It is well-known to those skilled in the art that many of the modern, microprocessor-based recloser controls (including those mentioned in the background section) support well-defined digital communications protocols such at DNP 3.0 and Pacific Gas and Electric Protocol in such a way as to allow the recloser functions to be selected, controlled and monitored over a communication port. This port is provided as part of the recloser control. The specific data values, status points, and control outputs that can be exchanged over communications are typically provided as predefined "points lists" by the designer or provider of the recloser.

In light of the functionality provided by the recloser and its communication interface, the functions of node controller of FIG. 2 can be partitioned between the add-on board and the retrofit recloser control as follows: The team communication functions 110, 218, 220 are provided by one or two of the communication channels 1101 and 1102 on the add-on board. The third channel, 1103 is used to communicate with the recloser. The team coordination logic performed by 208 and 210 including maintenance of the team database 210 is performed by the processor 1106 and memory 1105 of the add-on board. The node's user interface for team functions 209 remains with the add-on board 1107, while the recloser's user interface can still be used for accessing its standard functions. All of the recloser protection features including overcurrent fault detection 212, switch monitoring and control 216 are utilized, with the add-on board receiving status from all of these features over communications. Supervisory control over the recloser's associated switch (breaker) is provided to the add-on board via the communication protocol. Power management and battery backup 1104 must be provided separately for the additional add-on board/communication equipment, although this may in some circumstances be shared with the recloser's power supply 222.

In circumstances where the team logic requires interaction with data stored or processed in the recloser, the recloser point list is utilized. The presence of overcurrent faults, line voltage and other sensed or derived parameters are all readily obtainable in this manner. For example, load data required to support load pickup at steps 620 and 638 can be periodically sampled by the recloser, transferred to the add-on board using the point list and averaged inside the add-on board.

An additional benefit of the add-on board is its ability to extend the capabilities of the recloser's basic functions. For example, the Cooper Form 4C recloser supports only two protection profiles. Because of the additional storage and processing capabilities of the add-on board, additional profiles can be stored in the add-on board and loaded into the recloser when needed. In addition, the extensions to the representations of protection profiles presented in this invention can be applied uniformly to all retrofit reclosers without regard to the capabilities of the individual device.

Yet another embodiment of the add-on board is provided by including the optional analog and digital I/O block 1108. This embodiment could be utilized for interfacing to a substation breaker lacking an adequate digital communication capability to support the team functions. The digital I/O would then be connected to the breaker's status and override control points. The analog I/O would be connected to current and voltage sensing devices to allow the node to provide the load and voltage monitoring functions of a team member. The breaker's protection profile would be dictated by the breaker's independent settings and configured into the memory 1105 of the add-on board. Those skilled in the art will recognize that many possibilities exist for supporting team functionality in legacy or retrofit devices.

We claim:

1. A method for controlling the configuration of an electrical power distribution system having a plurality of distribution devices including circuit opening and closing functions, at least one of the plurality of distribution devices being a circuit protective device having selectable protection characteristic profiles, the method comprising the steps of:

responding to detected conditions requiring reconfiguration of the system and opening one or more of the distribution devices to isolate the detected condition;

communicating information between each of the plurality of distribution devices and at least one other of the plurality of distribution devices including required protection characteristics;

selecting one of the selectable protection characteristic profiles of the at least one circuit protective device; and controlling operation of the plurality of distribution devices to reconfigure the electrical power distribution system.

2. The method of claim 1 further comprising the step of restoring the distribution system to a normal configuration based on the detection of predetermined conditions that represent a resolution of the detected condition requiring reconfiguration, said restoring step including the selection of one of the selectable protection characteristic profiles of the at least one circuit protective device.

3. The method of claim 1 wherein said controlling step includes reconfiguring based on the available protection characteristics.

4. A system for controlling the configuration of an electrical power distribution system comprising:

a plurality of distribution devices having circuit opening and closing functions, at least one of the plurality of distribution devices being a circuit protective device having modifiable protection characteristics; and control means responding to detected conditions requiring reconfiguration of the system, communicating information between each of the plurality of distribution devices and at least one other of the plurality of distribution devices to facilitate the coordination of protection characteristics and the modifiable protection characteristics, and controlling operation of the plurality of distribution devices to reconfigure the electrical power distribution system.

5. The system of claim 4 wherein the control means coordinates the protection characteristics before operating the distribution devices to reconfigure the system.

6. The system of claim 4 wherein the control means reconfigures the system based on the available protection characteristics.

7. A system for controlling the configuration of an electrical power distribution system comprising:

a plurality of distribution devices arranged in the distribution system including at least one circuit protective device having modifiable protection characteristics, said distribution devices including facilities for opening and closing circuit paths in the distribution system; and control means responsive to first sensed conditions for coordinating a reconfiguration of the distribution system via the plurality of distribution devices, the control means comprising means for modifying the protection characteristics of the at least one circuit protective device based on the communication of required protection characteristics from one or more of the distribution devices.

8. The system of claim 7 wherein the control means further comprises circuit protective device communicating means for communicating modified protection characteristics to one or more of the distribution devices and distribution device means for operating to reconfigure the distribution system upon the receipt of the modified protection characteristics that satisfy predetermined reconfiguration protection.

9. The system of claim 7 wherein said control means comprises first means for selectively operating appropriate ones of a first type of the distribution devices to open upon detection of the first sensed conditions and second means for selectively operating appropriate at least one of a second type of the distribution devices to close to reconfigure the distribution system, appropriate respective distribution devices of the first type being reclosed after the appropriate respective distribution devices of the second type close based on predetermined conditions being satisfied for reconfiguration.

10. The system of claim 9 wherein the first sensed conditions for reconfiguration correspond to a fault condition and the first and second means operate to reconfigure the distribution system to isolate the fault condition.

11. The system of claim 7 wherein said control means is responsive to second sensed conditions representing a resolution of the first sensed conditions to restore the distribution system to a normal configuration.

12. The system of claim 11 wherein said control means modifies the protection characteristics of the at least one circuit protective device to a normal configuration when restoring the distribution system to a normal configuration.

13. The system of claim 11 wherein said control means during reconfiguration modifies the protection characteristics of the at least one circuit protective device to a second protection characteristic from a first normal configuration protection characteristic, and during restoring the distribution system to a normal configuration first modifies the protection characteristics of the at least one circuit protective to a third protection characteristic before achieving the normal configuration and modifying the protection characteristic of the at least one circuit protective device to the first normal configuration protection characteristic.

14. The system of claim 7 wherein said control means comprises communication means for coordinating protection characteristics with distribution devices that are not affected by the first sensed conditions.

15. The system of claim 7 wherein the communication of required protection characteristics is represented by measured load current.

16. The system of claim 7 wherein the communication of required protection characteristics is represented by a number of segments each of which corresponds to the section of the circuit between adjacent distribution devices.

17. The system of claim 16 wherein the communication of required protection characteristics additionally includes the number of segments for each direction of current flow in the distribution system.

18. The system of claim 7 wherein the communication of required protection characteristics is represented by the estimated load current at each of the distribution devices.

19. The system of claim 7 wherein the communication of required protection characteristics is represented by the maximum load current at each of the distribution devices.

20. A system for controlling the configuration of an electrical power distribution system comprising:
a plurality of distribution devices arranged in the distribution system including at least one circuit protective device having modifiable protection characteristics, said distribution devices including facilities for opening and closing circuit paths in the distribution system; and
control means for coordinating changes in the configuration of the distribution system via the operation of the distribution devices, the control means comprising first means for selectively modifying the protection characteristics of the at least one circuit protective device based on the communication of required protection characteristics from one or more of the distribution devices.

21. The system of claim 20 wherein the control means operates one or more of the plurality of distribution devices to provide fault isolation and reconfiguration of the distribution system in response to first predetermined sensed conditions and to provide restoration of the distribution system to a normal configuration in response to second predetermined sensed conditions, the first means during the restoration to a normal configuration modifying the protection characteristics of the at least one circuit protective device both before and after the restoration to the normal configuration.

22. The system of claim 21 wherein the modifying of the protection characteristic of the at least one circuit protective device comprises blocking of a ground fault protection characteristic before restoration and unblocking of the ground fault protection characteristic after restoration.

23. The system of claim 20 wherein the first means selectively modifies the protection characteristic of the at least one circuit protective device each time the control means coordinates changes in the configuration of the distribution system.

24. A method for controlling the configuration of an electrical power distribution system having a plurality of distribution devices including circuit opening and closing functions, the method comprising the steps of:
responding to detected conditions requiring reconfiguration of the system and opening one or more of the distribution devices to isolate the detected condition;
communicating information between each of the plurality of distribution devices and at least one other of the plurality of distribution devices;
at least one of the plurality of distribution devices communicating with at least one device external to the plurality of switch controllers to obtain additional information about the condition of the system that is used to control reconfiguration; and
controlling operation of the plurality of distribution devices to reconfigure the electrical power distribution system.

25. A system for automated reconfiguration of a distribution system, comprising:
a first plurality of switches, switches in the first plurality of switches being located in the distribution system;
a first plurality of switch controllers; and
switch controllers in the first plurality of switch controllers controlling respective switches in the first plurality of switches and including resources which monitor the distribution system, which communicate information with at least one other switch controller in the first plurality of switch controllers and which control operation of their respective switches to perform fault isolation or reconfiguration based on the detection of conditions requiring fault isolation and the communicated information, at least one of the switch controllers also communicating with at least one external device external to the first plurality of switch controllers to obtain additional information about the condition of the system that is used to control reconfiguration.

26. The system of claim 25 wherein at least one of the switch controllers communicates with at least one external device to control operation thereof.

27. The system of claim 25 wherein the at least one external device is at least one of a second plurality of switches located in the distribution system.

28. The system of claim 25 wherein the at least one external device also communicates with at least one of a second plurality of switch controllers.

29. A system for controlling the configuration of a distribution system, comprising:
a plurality of switches being arranged in a predetermined configuration in a distribution system; and
a plurality of switch controllers being arranged to control respective switches in the plurality of switches, each of the switch controllers being responsive to sensed conditions of the distribution system and comprising means for communicating information to one or more other of the plurality of switch controllers so as to transmit and receive communicated information about the status of the one or more switch controllers, each of the switch controllers in the plurality of switch controllers processes the sensed conditions and the communicated information in order to determine whether to operate their respective switches according to first predetermined conditions to perform fault isolation, thereafter to determine whether to operate their respective switches according to second predetermined conditions to perform reconfiguration of the distribution system and thereafter determining whether to perform a return to a normal configuration based on a resolution of the conditions requiring fault isolation and reconfiguration, at least one of the switch controllers communicating with at least one device external to the plurality of switch controllers to receive information about the condition of the system from and control operation of the at least one device to perform the functions of reconfiguration and/or a return to normal configuration.

30. A system for controlling the configuration of an electrical power distribution system comprising:

a plurality of distribution devices having circuit opening and closing functions; and control means responding to detected conditions requiring a reconfiguration of the system, communicating with at least one external device external to the plurality of distribution devices to obtain additional information about the condition of the system that is used to control a reconfiguration, communicating information between each of the plurality of distribution devices and at least one other of the plurality of distribution devices, and controlling operation of the plurality of distribution devices to reconfigure the electrical power distribution system.

* * * * *